United States Patent
Cave et al.

(10) Patent No.: US 6,845,154 B1
(45) Date of Patent: Jan. 18, 2005

(54) ALLOCATION OF RESOURCES TO FLEXIBLE REQUESTS

(75) Inventors: Ellis K. Cave, Plano, TX (US); Jody C. Bishop, Dallas, TX (US)

(73) Assignee: Intervoice Limited Partnership, Reno, NV (US)

( * ) Notice: Subject to any disclaimer, the term of this patent is extended or adjusted under 35 U.S.C. 154(b) by 549 days.

(21) Appl. No.: 09/767,927

(22) Filed: Jan. 23, 2001

(51) Int. Cl.[7] ............................................. H04M 3/00
(52) U.S. Cl. .......................... 379/265.02; 379/265.05; 379/265.09; 379/265.12
(58) Field of Search ...................... 379/265.02, 265.05, 379/265.09, 265.11, 265.12, 266.01, 266.02, 266.04

(56) References Cited

U.S. PATENT DOCUMENTS 5,206,903 A * 4/1993 Kohler et al. .......... 379/265.12
5,335,269 A * 8/1994 Steinlicht ................ 379/266.05
5,825,869 A * 10/1998 Brooks et al. ......... 379/265.12
6,366,666 B2 * 4/2002 Bengtson et al. ...... 379/265.06

OTHER PUBLICATIONS

U.S. patent application Ser. No. 09/330,258, Cave, filed Jun. 10, 1999.

* cited by examiner

Primary Examiner—Bing Q. Bui
(74) Attorney, Agent, or Firm—Fulbright & Jaworski LLP

(57) ABSTRACT

A system and method are disclosed which determine the flexibility of requests and utilize such flexibility of requests in managing a finite number of resources for servicing such requests. As an exemplary implementation within a telephony call center, a caller requesting to speak with an agent of the call center may be received. The call center may ascertain whether the caller is capable and willing to speak in multiple languages, such as both English and Spanish. A caller that is so capable and willing may be more efficiently serviced by allocating the "first available" of English and Spanish speaking resources to service the caller. Thus flexible requests that are capable and willing to be serviced by any of a plurality of resources, may be utilized to more effectively manage a finite number of resources in servicing requests.

50 Claims, 10 Drawing Sheets

| REQUEST | ENGLISH | SPANISH | FRENCH |
|---|---|---|---|
| $R_1$ | Y | Y | N |
| $R_2$ | N | Y | N |
| $R_3$ | N | N | Y |
| $R_4$ | Y | N | Y |
| $R_5$ | Y | N | Y |
| $R_6$ | Y | Y | Y |
| ⋮ | ⋮ | ⋮ | ⋮ |

350 →

| REQUEST | ENGLISH | SPANISH | FRENCH |
|---|---|---|---|
| $R_1$ | 1 | 2 | X |
| $R_2$ | X | 1 | X |
| $R_3$ | X | X | 1 |
| $R_4$ | 2 | X | 1 |
| $R_5$ | 1 | X | 1 |
| $R_6$ | 1 | 2 | 1 |
| ⋮ | ⋮ | ⋮ | ⋮ |

← 350

| 350 → REQUEST | ENGLISH DELAY | SPANISH DELAY | FRENCH DELAY |
|---|---|---|---|
| $R_1$ | 0 | 30 | X |
| $R_2$ | X | 0 | X |
| $R_3$ | X | X | 0 |
| $R_4$ | 30 | X | 0 |
| $R_5$ | 0 | X | 0 |
| $R_6$ | 0 | 30 | 0 |
| ⋮ | ⋮ | ⋮ | ⋮ |

ALLOCATION OF RESOURCES TO FLEXIBLE REQUESTS

RELATED APPLICATIONS

This application is related to co-pending and commonly assigned U.S. application Ser. No. 09/330,258 filed Jun. 10, 1999, entitled "ALLOCATION OF MULTI-FUNCTION RESOURCES," the disclosure of which is hereby incorporated herein by reference.

TECHNICAL FIELD

This invention relates generally to function-based routing in, for example, automatic call distributors or other structures allocating a limited number of resources to flexible incoming requests, and more specifically to a system and method that prioritizes the allocation of such resources taking into account the flexibility of the resource requests.

BACKGROUND

This invention relates to requests made to pools of limited resources, such as when a telephone caller is served by call agents in an agent pool, or when a computer application makes requests of a processor, or even when several mechanics are sharing tools out of one tool box. The invention has particular exemplary application for skills-based routing functionality in automatic call distributors ("ACDs").

In the prior art, requests from single-function (or "single-talent" or "single-skilled") requester's were made to resources capable of satisfying the requests. Such requests were typically directed in serial fashion via a unitary queue to a Pool Control Logic. The Pool Control Logic then directed each request to a resource capable of satisfying the single-function request. Typically, requests were served on a "first come, first served" basis. That is, as new requests reach the front of their respective queues, resources capable of satisfying the pending requests were typically allocated on a "first come, first served" basis. Typically, of the resources capable of satisfying a request, the resource that has been idle the longest period of time would be allocated to the request.

This state of the prior art is illustrated in FIG. 1, where, for example, automatic call distribution ("ACD") center 100 has a number of agents on duty, some of whom speak English (E) 102, some of whom speak Spanish (S) 104, and some of whom speak French (F) 106. Typically, agents from each queue may be assigned to satisfy a request based on each agent's idle time. That is, typically the agent that has been idle the longest period of time among the English speaking agents 107 may satisfy the next pending English request. The same may be true for the other agent pools, as well.

Single-function (or single-talent) callers 114 in unitary queue 116 make requests to ACD center 100 in sequence. The requests for resources are typically directed in serial fashion via the unitary queue 116 to a Pool Control Logic 112. Pool Control Logic 112 directs each request to a resource based on the type of resource requested. Thus, the Pool Control Logic 112 may work to direct an English speaking caller to an agent capable of speaking English, a Spanish speaking caller to an agent capable of speaking Spanish, and a French speaking caller to an agent capable of speaking French. As new requests reach the front of their respective queues, resources capable of satisfying the pending request are typically allocated on a "first come, first served" basis without regard to prospective flexibility of the request.

As an example illustrated by FIG. 1, caller $E_1$ requesting an English speaking agent is the first pending request in queue 114, caller $S_2$ requesting a Spanish speaking agent is the next pending request in queue 114, caller $F_3$ requesting a French speaking agent is the next pending request in queue 114, and so on. Typically, in a prior art system Pool Control Logic 112 may assign caller $E_1$ to an available agent from English pool 102. If no agent is available from pool 102, caller $E_1$ may be queued in queue 122 to await an agent from pool 102 to become available. Similarly, Pool Control Logic 112 may assign caller $S_2$ to an available agent from Spanish pool 104. If no agent is available from pool 104, caller $S_2$ may be queued in queue 124 to await an agent from pool 104 to become available. Likewise, Pool Control Logic 112 may assign caller $F_3$ to an available agent from French pool 106. If no agent is available from pool 106, caller $F_3$ may be queued in queue 126 to await an agent from pool 106 to become available.

Typically, the prior art does not consider the flexibility of a request in allocating resources to satisfy such a request. For example, suppose that a caller to the ACD system 100 of FIG. 1 is capable of speaking both English and Spanish. The prior art does not take advantage of such flexibility in allocating resources to service the caller, but instead pigeonholes the caller as being either an English speaking request or a Spanish speaking request. Generally, a request (e.g., a caller) is required to choose a single type of resource (e.g., an English speaking agent), even if the request is capable and willing to accept any of a plurality of different types of resources. More specifically, ACD system 100 of FIG. 1 generally utilizes an Interactive Voice Response Unit ("IVRU") to interact with a caller in order to ascertain the language in which the caller desires to speak. For instance, an IVRU may prompt a caller to "press 1 for English, press 2 for Spanish, or press 3 for French." Thus, a caller may designate the language in which the caller desires to interact with an agent. However, the ACD system 100 typically does not determine whether a caller is capable of speaking a plurality of languages and willing to interact with an agent in any of the plurality of languages.

Thus, as can be seen from the above-examples, the prior art allocates resources to requests without taking into account requesters' flexibility or multi-functionality. Rather, the prior art allocates resources to requests based solely on a single function (or single attribute or single characteristic) of the requesters.

SUMMARY OF THE INVENTION

As described above, prior art methods for allocating resources fail to utilize "flexible" (or "multi-function" or "multi-talent" or "multi-skilled") requests effectively. Continuing with the ACD example illustrated in FIG. 1, suppose that a particular caller is capable of speaking more than one language. Because in prior art methods the caller would be allocated to a resource based solely on a single language skill, prior art methods do not utilize such flexible/multi-functional requests effectively. For example, suppose a caller is capable of speaking both English and Spanish. Utilizing a prior art method of allocating resources, such a caller must be queued for either a resource from pool 102 or a resource from pool 104. Accordingly, such a caller may either be allocated to be serviced by agents from English speaking pool 102 or agents from Spanish speaking pool 104, but not both. That is, Pool Control Logic 112 may attempt to satisfy a caller's request utilizing either a resource from pool 102 or utilizing a resource from pool 104, but does not attempt to choose a resource utilizing both pools.

Therefore, this prior art method does not utilize the full capabilities of such a multi-skilled requester.

It should be understood that the resources may also be multi-functional (or "multitalented" or "multi-skilled"). Allocation of multi-function resources is the subject of co-pending and commonly assigned U.S. patent application Ser. No. 09/330,258, entitled "ALLOCATION OF MULTI-FUNCTION RESOURCES." Such patent application details a method and system for allocating resources to requests in a manner that utilizes multi-function resources effectively in satisfying the requests.

Prior art methods of allocating resources to requests simply allocate the resources based on a "first come, first serve" basis, without regard to each request's (or requester's) capabilities, flexibility, or value. Prior art methods of allocating resources to requests attempt to satisfy requests (e.g., queue requests for the appropriate resources) based solely upon a single function or attribute or characteristic of the request, without taking into consideration a request's flexibility or multi-functionality. That is, prior art methods pigeon-hole multi-function, flexible requesters into a single type of request. It is desirable to have more flexible requests utilized for more effective allocation of resources. Also, it is desirable to have more scarce/flexible/valuable resources allocated to requests in a more efficient manner by taking into account a request's flexibility/multi-functionality to better manage resources.

In an attempt to service requests in an efficient manner, traditional skills-based routing and management has been utilized in the prior art. Good management adds only sufficient additional resources, however, to avoid long waiting periods by adding resources to the pools that are anticipated to be requested the most, which often results in resources standing idle. Much of the difficulty in the prior art in achieving an efficient balance of these competing forces stems from having to work around the inflexibility of requests into which requesters have been pigeon-holed based solely upon a single functionality/attribute/ characteristic of each requester. An improved resource management approach would make requests to multiple pools of resources corresponding to the flexibility or multi-functionality of the requester, and such requests would be maintained concurrently for each pool. This paradigm would give improved flexibility in satisfying or servicing flexible/ multi-functional requesters.

There is therefore a need in the art to manage flexible requests (i.e., requests from flexible requesters) more effectively by directing and monitoring requests in a manner that takes into account such request's flexibility (or "multi-functionality") rather than issuing or pigeon-holing each serial request to a particular pool of resources based solely upon one functionality/attribute/characteristic of the request. There is also a need in the art for a protocol by which to manage such flexible requests so that the flexibility of the requests are fully optimized toward cost-effective service.

The present invention is directed to a system and method which determine the flexibility of requests and utilize such flexibility of requests in managing a finite number of resources for servicing such requests. It should be recognized that the flexibility of a request is typically a result of the flexibility of the requester having issued such request. Therefore, when referring herein to the flexibility of a request, it should be understood that such flexibility of a request likely, in actuality, corresponds to the flexibility of a requester. Thus, "flexibility of requests" as used herein is generally interchangeable with "flexibility of requesters." That is, one may think of a request as being flexible (or multi-functional) in that the request is capable of being satisfied by any of a plurality of different resources, and similarly one may think of a requester that issues a request as being flexible (or multi-functional) in that the requester may is capable of being satisfied by any of a plurality of different resources responding to a request issued by such requester. Thus, while much of the description of embodiments of the present invention may be described herein with reference to the flexibility of a request, it should be understood that such flexibility is intended to encompass the flexibility of the requester that issued such request.

The resource management scheme of a most preferred embodiment is implemented to manage resources within a telephony call center. For example, the resource management scheme of a most preferred embodiment is utilized to manage/allocate call center agents to service received callers to the telephony call center. A most preferred embodiment determines the flexibility of the callers, and utilizes such flexibility (if any) in effectively managing/allocating the available agents to service such callers. Suppose, for instance, that a resource management scheme is implemented within a telephony call center having English speaking agents, Spanish speaking agents, and French speaking agents to allocate appropriate agents to received callers. Such resources may be implemented within separate, homogeneous pools, i.e., an English speaking pool of resources, a Spanish speaking pool of resources, and a French speaking pool of resources.

The resource management scheme may receive callers to the call center, determine the appropriate resource pool(s) for servicing the callers, and attempt to allocate an available one of the appropriate resources to service each caller. Callers may be received that are only capable of speaking a single language, such as English, Spanish, or French. In attempting to service such inflexible callers, the resource management scheme is limited to only selecting an available resource from one pool of resources (i.e., from the pool of resources having the same language skill as that possessed by the caller). However, other callers may be received that are capable and willing to be serviced by any agent of different pools. For instance, a caller that is capable of speaking both English and Spanish, may be capable and willing to be serviced by an available agent from either the English speaking pool of agents or the Spanish speaking pool of agents. By utilizing such flexibility of received requests (e.g., from callers), the resource management scheme can more effectively and more efficiently manage its resources (e.g., agents).

Such a resource management scheme of a most preferred embodiment is somewhat analogous to the allocation of tables (e.g., resources) within a restaurant to customers (e.g., requesters). For example, it may be ascertained by a restaurant employee whether a customer desires to be seated in a smoking section or a non-smoking section of the restaurant. If required to choose one or the other, then the potential flexibility of a customer is disregarded, and the customer is pigeon-holed into only one section, much like requests for resources in prior art resource allocation schemes, as described above. However, a flexible customer (e.g., one willing to be seated in either smoking or non-smoking sections of the restaurant) may be given the option of selecting the section that is "first available" to the customer. By doing so, the customer may be serviced in a much more efficient manner.

Likewise, in a telephony call center, it may be ascertained whether a caller is capable and willing to speak in multiple languages, such as both English and Spanish, and a caller that is so capable and willing may be more efficiently serviced by allocating the "first available" of English and Spanish resources to service the caller. As disclosed in greater detail hereafter, flexible requests need not be serviced only on a "first available" basis, but rather preferences of the requests and/or the resource manager may be considered in allocating resources to such flexible requests. For example, a caller to a telephony call center that is capable and willing to be serviced by either an English speaking agent or a Spanish speaking agent may be satisfied by the first of the English and Spanish agents to become available, as described above. However, such a flexible caller may prefer to be serviced by an English speaking agent. Such a preference of the flexible caller may be taken into account in allocating resources (e.g., agents) by, for example, first attempting to service the caller with an English speaking agent, and only allocating a Spanish speaking agent to the caller if an English speaking agent is not obtained within a particular amount of time (e.g., a "threshold" amount of time).

Thus, the preference of a flexible caller may be taken into account in managing resources. Additionally or alternatively, the preferences of the resource manager may be considered. For example, a resource manager may desire to service a flexible caller with a particular resource. For instance, suppose a caller to a telephony call center is capable and willing to be serviced by either an English or Spanish speaking agent. A resource manager may prefer that the caller be serviced by a Spanish speaking agent. For instance, the telephony call center may be receiving a particularly high volume of callers requesting English speaking resources and particularly low volume of callers requesting Spanish speaking resources, and the resource manager may therefore desire to service the flexible caller with the less busy Spanish resources rather than adding a further request to the already busy English resources. Such a preference of the resource manager may be taken into account in allocating resources (e.g., agents) by, for example, first attempting to service the caller with a Spanish speaking agent, and only allocating an English speaking agent to the caller if a Spanish speaking agent is not obtained within a particular amount of time (e.g., a "threshold" amount of time).

It should be appreciated that the invention as described herein is not intended to be limited to language-oriented resources and requests. Furthermore, the present invention is not intended to be limited to a telephony call center environment. Rather, such an environment is intended solely as an example that renders the disclosure enabling for many other environments in which a finite number of resources are managed to service flexible requests. Thus, the invention is intended to apply with equivalent enabling effect generally to allocating any type of resources to any type of flexible requests. For instance, the present invention is intended to be enabling on many types of flexible requests for resources, such as telephone callers with multi-lingual capability, or flexible requests for data elements in a database, or flexible requests for computer network resources, or flexible requests for telephony network resources, or even, for example, flexible requests made by mechanics sharing tools out of a unitary toolbox. Thus, the resource management scheme of the present invention is not intended to be limited solely to the exemplary telephony resources provided herein, but may be applied equally to various other types of resources. As one example, various types of flexible requests for computer resources may be received and utilized for better management of the computer resources in servicing requests.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

A most preferred embodiment of the present invention is implemented within a telephony call center for allocating resources of the call center (e.g., agents) to service requests (e.g., received calls). It should be recognized that such a call center may be an inbound call center that primarily receives and services inbound calls, an outbound call center that primarily places outbound calls to provide a service, or a hybrid that services both inbound and outbound calls. It should be further recognized that the present invention has a much broader application than only within a call center. That is, the resource management scheme disclosed herein may be utilized for any type of system/environment in which it is desirable to allocate a limited number of resources to requests in order to service such requests. Thus, many other environments may exist in which a limited number of resources are to be managed to allow for effective allocation of such resources to service requests, and any such environment is intended to be within the scope of the present invention. Accordingly, the present invention is not intended to be limited only to the environments provided herein, such as telephony call centers, but rather such environments are intended solely as examples that render the disclosure enabling for many other environments in which resource management is desirable.

Figure 1:
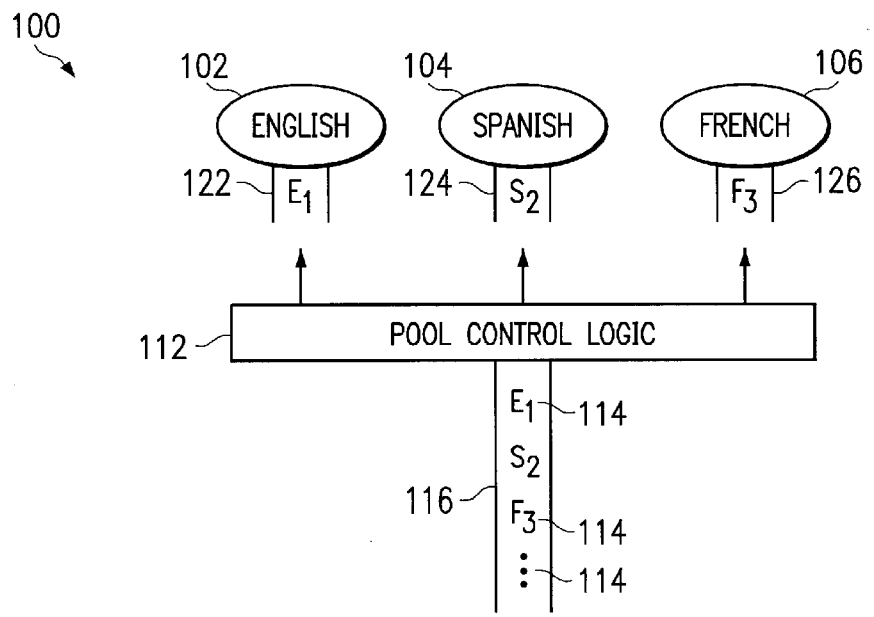
FIG. 1 illustrates serial, single-function requests of the prior art in which each single-function request is presented to a particular resource pool capable of satisfying such single-function request.
Figure 2:
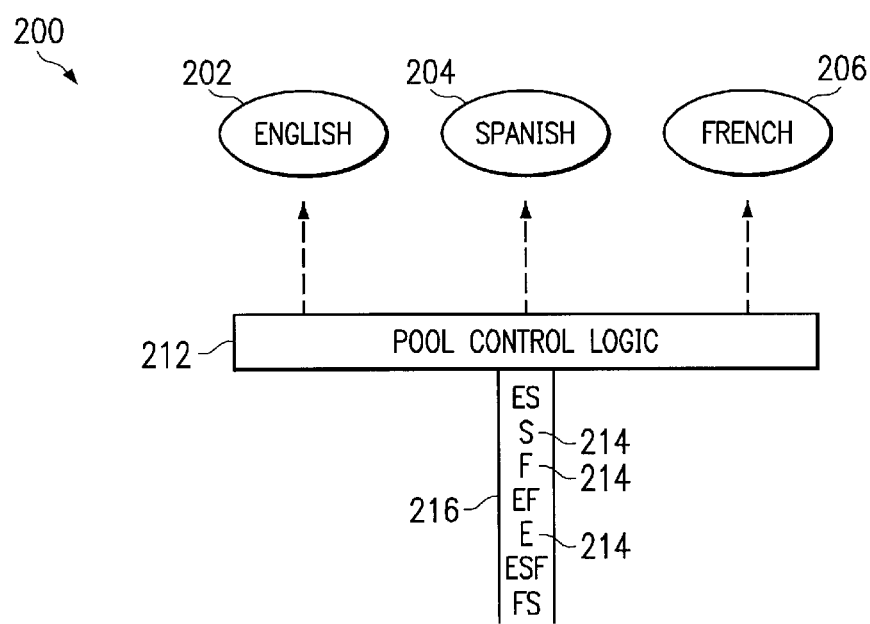
FIG. 2 illustrates an exemplary implementation of a preferred embodiment utilizing flexible requests to provide improved management of resources for satisfying such requests.

Turning to FIG. 2, an exemplary telephony call center implementation of a preferred embodiment of the present invention is shown. More specifically, an exemplary implementation for an ACD 200 is shown. As illustrated by FIG. 2, a preferred implementation may utilize flexible/multi-functional requests to provide improved management of resources for satisfying such requests. As illustrated, pools of resources capable of servicing requests may be provided. More specifically, pool 202 of English speaking resources, pool 204 of Spanish speaking resources, and pool 206 of French speaking resources may be provided. Additionally, requests from callers (or "requesters") 214 requesting a resource may be queued in queue 216 for Pool Control Logic 212. Pool Control Logic 212 may receive each caller's request, and make a request for a resource to service each caller's request from resource pools 202, 204, and 206.

As illustrated, a request 214 may be for an agent or "resource" that speaks a specific language, such as English (E), French (F), or Spanish (S). Queue 216 may also contain requests from callers that are bilingual, speaking both English and Spanish (ES), both English and French (EF), or both French and Spanish (FS). Queue 216 may also contain requests from callers that are trilingual, speaking English, Spanish and French (ESF). Pool Control Logic 212 allocates each received request to the resource pools able to service the request. For example, Pool Control Logic 212 may issue a request for a resource from English pool 202 to service an English speaking request, a request for a resource from Spanish pool 204 to service a Spanish speaking request, or a request for a resource from French pool 206 to service a French speaking request. Furthermore, Pool Control Logic 212 may make requests to multiple pools of resources in an attempt to service a flexible (e.g., multi-lingual) request. For example, Pool Control Logic 212 may make a request to both English pool 202 and Spanish pool 204 in an attempt to obtain an available resource to service a flexible request capable and willing to be serviced by either an English or Spanish resource.

Such a resource management scheme of a most preferred embodiment is somewhat analogous to the allocation of tables (e.g., resources) within a restaurant to customers (e.g., requesters). For example, it may be ascertained by a restaurant employee whether a customer desires to be seated in a smoking section or a non-smoking section of the restaurant. If required to choose one or the other, then the potential flexibility of a customer is disregarded, and the customer is pigeon-holed into only one section, much like requests for resources in prior art resource allocation schemes, as described above. However, a flexible customer (e.g., one willing to be seated in either smoking or non-smoking sections of the restaurant) may be given the option of selecting the section that is "first available" to the customer. By doing so, the customer may be serviced in a much more efficient manner.

Likewise, in the exemplary ACD 200 of FIG. 2, it may be ascertained whether a caller is capable and willing to speak in multiple languages, such as both English and Spanish, and a caller that is so capable and willing may be more efficiently serviced by allocating the "first available" of English and Spanish resources to service the caller. Each requester 214 may simply make a request for an appropriate resource to Pool Control Logic 212, and Pool Control Logic 212 may then issue one or more requests to the pools of resources capable of servicing requests. For instance, a caller capable and willing to be serviced by either an English resource or a Spanish resource may be received by Pool Control Logic 212, and Pool Control Logic 212 may issue requests to English pool 202 and Spanish pool 204 for a resource (e.g., agent) to service such caller. Of course, the multiple requests issued by Pool Control Logic 212 may be transparent to the requester 214. That is, the requester 214 may not be aware of the requests made to the pools of resources by Pool Control Logic 212. Pool Control Logic 212 may accept requests from requesters 214 in a manner similar to Pool Control Logics of the prior art. That is, Pool Control Logic 212 may receive requests in sequence. However, according to a preferred embodiment of the present invention, Pool Control Logic 212 may utilize the flexibility/multi-functionality of requests in allocating resources to each request.

As disclosed in greater detail hereafter, flexible requests need not be serviced only on a "first available" basis, but rather preferences of the requests and/or the resource manager may be considered in allocating resources to such flexible requests. For example, a caller to ACD system 200 of FIG. 2 that is capable and willing to be serviced by either an English speaking agent or a Spanish speaking agent may be satisfied by the first of the English and Spanish agents to become available, as described above. However, such a flexible caller may prefer to be serviced by an English speaking agent. Such a preference of the flexible caller may be taken into account in allocating resources (e.g., agents) by, for example, first attempting to service the caller with an English speaking agent, and only allocating a Spanish speaking agent to the caller if an English speaking agent is not obtained within a particular amount of time (e.g., a "threshold" amount of time). For instance, a request may initially be made by Pool Control Logic 212 only to English pool 202 in an attempt to obtain an English speaking agent to service the received caller, and if an English speaking agent is not obtained within one minute thereafter, then a request may be made to the Spanish pool 204 in an attempt to service the received caller with the first agent to become available from either the English pool 202 or Spanish pool 204.

Thus, the preference of a flexible caller may be taken into account in managing resources. Additionally or alternatively, the preferences of the resource manager may be considered. For example, a resource manager may desire to service a flexible caller with a particular resource. For instance, suppose a caller to ACD system 200 of FIG. 2 is capable and willing to be serviced by either an English or Spanish speaking agent. A resource manager may prefer that the caller be serviced by a Spanish speaking agent. For instance, the ACD system 200 may be receiving a particularly high volume of callers requesting English speaking resources and particularly low volume of callers requesting Spanish speaking resources, and the resource manager may therefore desire to service the flexible caller with the less busy Spanish resources rather than adding a further request to the already busy English resources. Such a preference of the resource manager may be taken into account in allocating resources (e.g., agents) by, for example, first attempting to service the caller with a Spanish speaking agent, and only allocating an English speaking agent to the caller if a Spanish speaking agent is not obtained within a particular amount of time (e.g., a "threshold" amount of time). For instance, a request may initially be made by Pool Control Logic 212 only to Spanish pool 204 in an attempt to obtain a Spanish speaking agent to service the received caller, and if a Spanish speaking agent is not obtained within one minute thereafter, then a request may be made to the English pool 202 in an attempt to service the received caller with the first agent to become available from either the English pool 202 or Spanish pool 204.

Of course, in alternative implementations, the requesters need not be callers to a telephony call center, and the resources need not be call center agents for servicing callers. For example, Pool Control Logic 212 of FIG. 2 may embody a sophisticated automated banking system comprising several different pools of text-to-speech (TTS) resources (e.g., TTS converters) available to callers, including pool 202 of English TTS resources, pool 204 of Spanish TTS resources, and pool 206 of French TTS resources. In this example, a request for a French TTS resource may only be satisfied by a pool or pools of TTS resources capable of speaking French (e.g., Pool 206 of FIG. 2). A request for a Spanish TTS resource may only be satisfied by a pool or pools of TTS resources capable of speaking Spanish (e.g., Pool 204 of FIG. 2). English TTS requests may only be satisfied by a pool or pools of TTS resources capable of speaking English (e.g., Pool 202 of FIG. 2). Assuming the goal is to use the first available appropriate resource to service each request (so that a caller is made to wait the shortest possible time before being served), when a caller is capable of speaking multiple languages (i.e., is a multi-functional or flexible caller) a preferred embodiment enables simultaneous requests to be made to each pool of resources capable of servicing such a caller. For example, if a caller is capable of speaking both English and Spanish (ES), simultaneous requests may be issued by Pool Control Logic 212 to pool(s) of resources capable of servicing the request in English and to pool(s) of resources capable of servicing the request in Spanish. The pending requests may be maintained concurrently for each pool capable of satisfying the flexible request. When one of the pools produces an available resource for the request, the remaining concurrently pending requests are removed from the respective queues, and the resource ID from the "winning pool" is sent to the requesting process (i.e., to service the flexible request).

Rather than issuing simultaneous requests to each pool of resources capable of satisfying a flexible requester, requests may be issued in a manner that accounts for the preferences of a flexible requester. For example, a request may first be issued to pool(s) of resources most preferred by a requester. If after a determined period of time the request remains unsatisfied, a request may be issued to less preferable pool(s) of resources, and the pending requests may be maintained concurrently for each pool of resources for which a request has been made. Further, if after a second determined period of time the request remains unsatisfied, a request may be issued to still less preferable pool(s) of resources, and the pending requests may be maintained concurrently for each pool of resources for which a request has been made. Further still, if after a third determined period of time the request remains unsatisfied, a request may be issued to least preferable pool(s) of resources, and the pending requests may be maintained concurrently for each pool of resources for which a request has been made, and so on. When one of the pools produces an available resource for servicing the flexible request, the remaining concurrently pending requests are removed, and the resource ID from the "winning pool" is sent to the requesting process (i.e., to service the flexible request).

For example, a flexible caller to ACD system 200 of FIG. 2 may speak English, Spanish and French. However, the caller may prefer to speak English. The caller's second, less preferred language may be Spanish, and the caller's third, least preferred language may be French. Thus, the Pool Control Logic 212 may first attempt to service the caller's request with an English speaking resource by making a request to English Pool 202. If after a determined period of time an English speaking resource from pool 202 is not obtained to service the flexible caller, the Pool Control Logic 212 may issue a request to pool 204 for a Spanish speaking resource. Assuming that a Spanish speaking resource is not immediately available, the Spanish request to pool 204 may remain pending concurrently with the English request to pool 202 for the flexible caller. If after a determined period of time neither an English speaking resource from pool 202 nor a Spanish speaking resource from pool 204 is obtained to service the flexible caller, the Pool Control Logic 212 may issue a request to pool 206 for a French speaking resource. Assuming that a French speaking resource is not immediately available, the French request to pool 206 may remain pending concurrently with the English and Spanish requests (i.e., to pools 202 and 204, respectively) for the flexible caller. Thereafter, the first resource from pools 202, 204, and 206 to become available is assigned to service the flexible caller, and the remaining requests pending for the flexible caller (i.e., the requests for the other pools of resources) will be removed.

As discussed above, a flexible requester's preferences may be taken into account by prioritizing certain types of resources over others through the use of a time sequence (or "cascade") of requests to the appropriate resources. Utilizing such a time sequence (or "cascade") approach to prioritize requests, a flexible requester's preferences may be taken into account while still attempting to satisfy the flexible requester in a timely fashion. Thus, the somewhat conflicting goals of satisfying a requester quickly and satisfying a requester in a manner preferred by the requester may be balanced by the cascade approach. Such an embodiment that is capable of taking into account a flexible requester's preferences will be discussed in greater detail hereafter.

Alternatively, resources may be managed to service a flexible request in a manner that accounts for the resource manager's preferences, rather than the flexible requester's preferences. For example, a request may first be issued to less scarce/less valuable pool(s) of resources. If after a determined period of time the request remains unsatisfied, a request may be issued to more scarce/more valuable pool(s) of resources, and the pending requests may be maintained concurrently for each pool of resources for which a request has been made. Further, if after a second determined period of time the request remains unsatisfied, a request may be issued to still more scarce/more valuable pool(s) of resources, and the pending requests may be maintained concurrently for each pool of resources for which a request has been made. Further still, if after a third determined period of time the request remains unsatisfied, a request may be issued to most scarce/most valuable pool(s) of resources, and the pending requests may be maintained concurrently for each pool of resources for which a request has been made, and so on. When one of the pools produces an available resource for the flexible request, the remaining concurrently pending requests are removed, and the resource ID from the "winning pool" is sent to the requesting process (i.e., to service the flexible request).

Continuing with the ACD example illustrated in FIG. 2, suppose that there exist 10 agents or resources in English pool 202, 5 agents or resources in Spanish pool 204, and 2 agents or resources in French pool 206. A manager of the ACD may desire to first attempt to service a flexible/multi-functional request with a less scarce resource to save more scarce resources. Thus, suppose that ACD 200 receives a flexible caller that is capable of speaking English, Spanish, and French. Pool Control Logic 212 may attempt to first service the flexible caller's request by issuing a request to English pool 202 because that pool has the most resources that are capable of servicing the flexible caller. Assuming that a resource is not immediately available from English pool 202, the request may be queued for pool 202. If after a determined period of time an English speaking resource is not obtained from pool 202 to service the flexible caller, a request may be issued to Spanish pool 204 because that pool has the second most resources that are capable of servicing the flexible caller, and the pending requests for pools 202 and 204 may be maintained concurrently. If after a second determined period of time neither an English speaking resource from pool 202 nor a Spanish speaking resource from pool 204 is obtained to service the flexible caller, a request may be issued to French pool 206 because that pool has the least number of resources that are capable of servicing the flexible caller, and the pending requests for pools 202, 204 and 206 may be maintained concurrently. When one of the pools produces an available resource for servicing the flexible caller, the remaining concurrently pending requests are removed, and the resource ID from the "winning pool" is sent to the requesting process (i.e., to service the flexible caller).

In such an alternative implementation, a time sequence (or "cascade") may be utilized to prioritize requests issued to resources that are capable of servicing a flexible request in a manner that achieves optimum use of the resources. Utilizing such a time sequence (or "cascade") approach to prioritize requests, a resource manager's preferences may be taken into account while still attempting to satisfy the flexible requester in a timely fashion. Thus, the somewhat conflicting goals of satisfying a requester quickly and satisfying a requester in a manner preferred by the resource manager may be balanced by the cascade approach. Thus, the flexibility or multi-functionality of requests may be utilized to achieve optimum use of the resources. In this manner, the provider or manager of the resources may take advantage of a request's flexibility to optimize the efficiency and use of the resources. Such an embodiment that is capable of taking into account a system's or resource manager's preferences will be discussed in greater detail hereafter.

In yet another alternative embodiment, the preferences of a flexible requester and the preferences of a resource manager may both be utilized and taken into account to a certain degree. For example, the preferences of a flexible requester and the preferences of a resource manager may be balanced when allocating resources to service such a flexible requester. For instance, in such an alternative embodiment, a time sequence (or "cascade") may be utilized to prioritize requests in a manner that balances the preferences of a flexible requester and the preferences of a resource manager. Utilizing such a time sequence (or "cascade") approach to prioritize requests, both a flexible requester's and resource manager's preferences may be taken into account while still attempting to satisfy the requester in a timely fashion. Thus, the somewhat conflicting goals of satisfying a flexible requester quickly, satisfying a flexible requester in a manner preferred by the requester, and satisfying a flexible requester in a manner preferred by a resource manager may be balanced by the cascade approach. Thus, the flexibility or multi-functionality of requesters may be utilized to achieve a balanced use of the resources. Alternatively, the preferences of a requester may be considered when utilization of the resources is not strained, for example. For instance, when the call volume to ACD system 200 of FIG. 2 is relatively low, the preferences of flexible callers may be considered in allocating agents to service such flexible callers. However, when the call volume to ACD system 200 is high, the preferences of flexible callers may be disregarded and the preferences of the resource manager may instead be considered to enable more efficient overall operation of ACD system 200 during such high call volume. Such an embodiment that is capable of taking into account both a requester's preferences and a resource manager's preferences will be discussed in greater detail hereafter.

Figures 3, 4, 5:
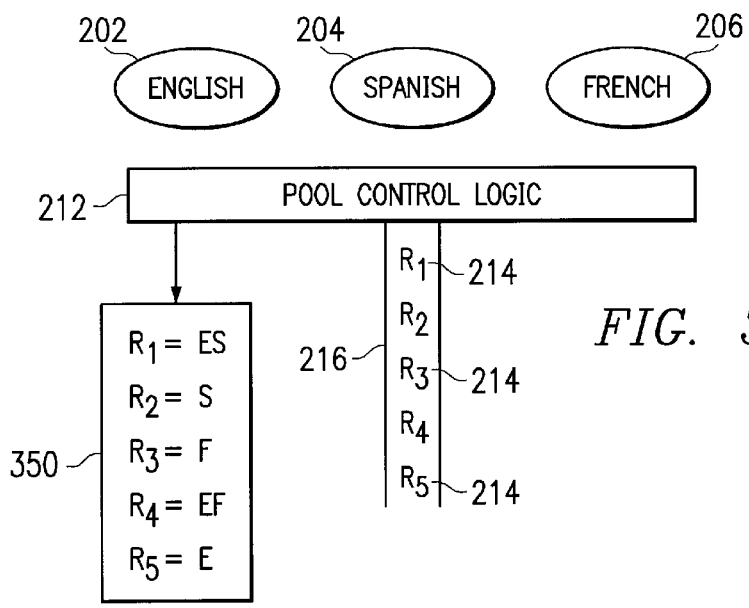
FIG. 3 illustrates an exemplary implementation of a preferred embodiment in which each request's flexibility is identified.
FIG. 4 illustrates an exemplary structure for identifying requests' flexibility.
FIG. 5 illustrates an exemplary structure for identifying requests' flexibility and preferences.

As described above, a preferred embodiment utilizes the flexibility of requests to effectively manage resources to service such flexible requests. Of course, before the flexibility of a request may be utilized in managing resources in this manner, the flexibility of requests need to be determined and/or identified. Turning to FIG. 3, one method of determining the flexibility of a request and identifying or labeling the flexibility of a request is illustrated. As shown, Pool Control Logic 212 receives requests 214 which are queued in Queue 216. As a request is received, the flexibility/functionality of such request may be determined. Such flexibility/functionality of a request may be determined by interacting with a requester. For example, in an ACD environment the ACD may interact with a caller by asking the caller questions and receiving responses from the caller. More specifically, a user may press telephone keys and the ACD may recognize the corresponding Dual Tone Multi-Frequency ("DTMF") signals, or a user may speak responses or commands to the ACD and the ACD may utilize voice recognition technology to interpret the spoken responses. Alternatively, a request may be obtained from a profile maintained for the requester. For example, utilizing the previous bank example, the bank may have a profile for its customers that provides the bank's system with information about each customer's flexibility/functionality and possibly each customer's preferences. Alternatively, other methods may be utilized for receiving a requester's flexibility/functionality capabilities and a requester's preferences, and any method suitable for receiving such information is intended to be within the scope of the present invention.

Once the flexibility/functionality is determined for each request, Pool Control Logic 212 may identify each request's flexibility/functionality, as illustrated by block 350 in FIG. 3. Many methods exist for Pool Control Logic 212 to identify or label the flexibility/functionality of each request. Block 350 of FIG. 3 may be a file, database, table, data structure, or other type of structure for relating a request's flexibility/functionality with the request. For example, in the ACD environment illustrated in FIG. 3, Pool Control Logic 212 may receive request $R_1$. After determining that request $R_1$ is capable of speaking both English and Spanish, Pool Control Logic 212 may identify or label request $R_1$ appropriately (e.g., "ES"), as shown in block 350. Thereafter, Pool Control Logic 212 may utilize such identification or label to effectively service request $R_1$. For example, Pool Control Logic 212 may make requests for a resource from both English pool 202 and Spanish pool 204 in an attempt to satisfy request $R_1$ in a quick and efficient manner. That is, Pool Control Logic 212 may attempt to satisfy request $R_1$ with the first available resource from pools 202 and 204, as described above.

Continuing with the exemplary ACD environment illustrated in FIG. 3, Pool Control Logic 212 may receive request $R_2$ and determine that request $R_2$ is capable of speaking only Spanish. Thus, Pool Control Logic 212 may identify or label request $R_2$ appropriately (e.g., "S"), as shown in block 350. Also, Pool Control Logic 212 may receive request $R_3$ and determine that request $R_3$ is capable of speaking only French. Thus, Pool Control Logic 212 may identify or label request $R_3$ appropriately (e.g., "F"), as shown in block 350. Additionally, Pool Control Logic 212 may receive request $R_4$ and determine that request $R_4$ is capable of speaking both English and French. Thus, Pool Control Logic 212 may identify or label request $R_4$ appropriately (e.g., "EF"), as shown in block 350. Further, Pool Control Logic 212 may receive request $R_5$ and determine that request $R_5$ is capable of speaking only English. Thus, Pool Control Logic 212 may identify or label request $R_5$ appropriately (e.g., "E"), as shown in block 350. Utilizing the identification or label information for each request, Pool Control Logic 212 may allocate resources in a desirable manner to service the received requests.

A further example of how requests may be identified or labeled is shown in FIG. 4. As shown in FIG. 4, block 350 may be a table that identifies each request and their corresponding flexibility/functionality. For example, request $R_1$ may have a "Y" (e.g., "Yes") corresponding to English and Spanish and a "N" (e.g., "No") corresponding to French, indicating that requester $R_1$ is capable of speaking both English and Spanish but not French. Request $R_2$ may have a "Y" corresponding to Spanish and a "N" corresponding to both English and French, indicating that requester $R_2$ is capable of only speaking Spanish. Request $R_3$ may have a "Y" corresponding to French and a "N" corresponding to both English and Spanish, indicating that requester $R_3$ is capable of only speaking French. Request $R_4$ may have a "Y" corresponding to both English and French and a "N" corresponding to Spanish, indicating that requester $R_4$ is capable of speaking both English and French but not Spanish. Likewise, request $R_5$ may have a "Y" corresponding to both English and French and a "N" corresponding to Spanish, indicating that requester $R_5$ is capable of speaking both English and French but not Spanish. Finally, request $R_6$ may have a "Y" corresponding to English, Spanish and French, indicating that requester $R_6$ is capable of speaking all three languages. It should be understood that a structure other than a table may be utilized to relate a request's flexibility/functionality with the request, including a file, database, data structure, or other type of structure.

In a most preferred embodiment, a request may be flexible but have a preference as to the type of resource desired. For example, as described above, a requester may speak both English and Spanish, but prefer to speak English. In a preferred embodiment, Pool Control Logic 212 may utilize a flexible request's preferences to attempt to satisfy the request with a preferred resource, while still attempting to satisfy the request in a timely manner. Turning to FIG. 5, an exemplary table 350 that may be utilized by Pool Control Logic 212 for identifying the flexibility and preferences of each request is shown. For example, a request $R_1$ may be received which is capable of speaking both English and Spanish. Additionally, request $R_1$ may prefer to speak English over Spanish. Pool Control Logic 212 may identify the flexibility/functionality and preferences of request $R_1$ as shown in FIG. 5. That is, Pool Control Logic 212 may identify request $R_1$ as preferring to speak English by providing a "1" for English in table 350, and as also being capable of speaking Spanish by providing a "2" for Spanish in table 350, corresponding respectively to request $R_1$. Thus, the functional capability of request $R_1$ may be numbered sequentially from most preferred to least preferred.

Continuing with the exemplary table illustrated in FIG. 5, requests $R_2$ and $R_3$ may only speak Spanish and French, respectively. Pool Control Logic 212 may identify those requests' flexibility/functionality in table 350 by providing a "1" in the appropriate column for each request. Request $R_4$ may speak both English and French, but prefer to speak French. Accordingly, Pool Control Logic 212 may identify request $R_4$ as preferring to speak French by providing a "1" for French in table 350, and as also being capable of speaking English by providing a "2" for English in table 350, corresponding respectively to request $R_4$.

As a further example, request $R_5$ may speak both English and French and may have no preference between those languages. That is, request $R_5$ may not prefer one language (English or French) over the other. In a preferred embodiment, Pool Control Logic 212 may identify the request's flexibility/functionality and preference (or lack thereof) by providing a "1" for both English and French in table 350 corresponding to request $R_5$. Thus, Pool Control Logic 212 may determine from table 350 that request $R_5$ is capable of speaking both English and French and does not prefer one language over the other. Taking this example a step further, suppose that request $R_6$ is capable of speaking English, French and Spanish. Further suppose that request $R_6$ prefers to speak English or French over Spanish, but does not have a preference between English and French. Pool Control Logic 212 may identify such flexibility/functionality and preference by providing a "1" for both English and French in table 350, corresponding to request $R_6$. Pool Control Logic 212 may further identify the flexibility/functionality and preference of request $R_6$ by providing a "2" for Spanish in table 350, corresponding to request $R_6$.

Figures 6, 15:
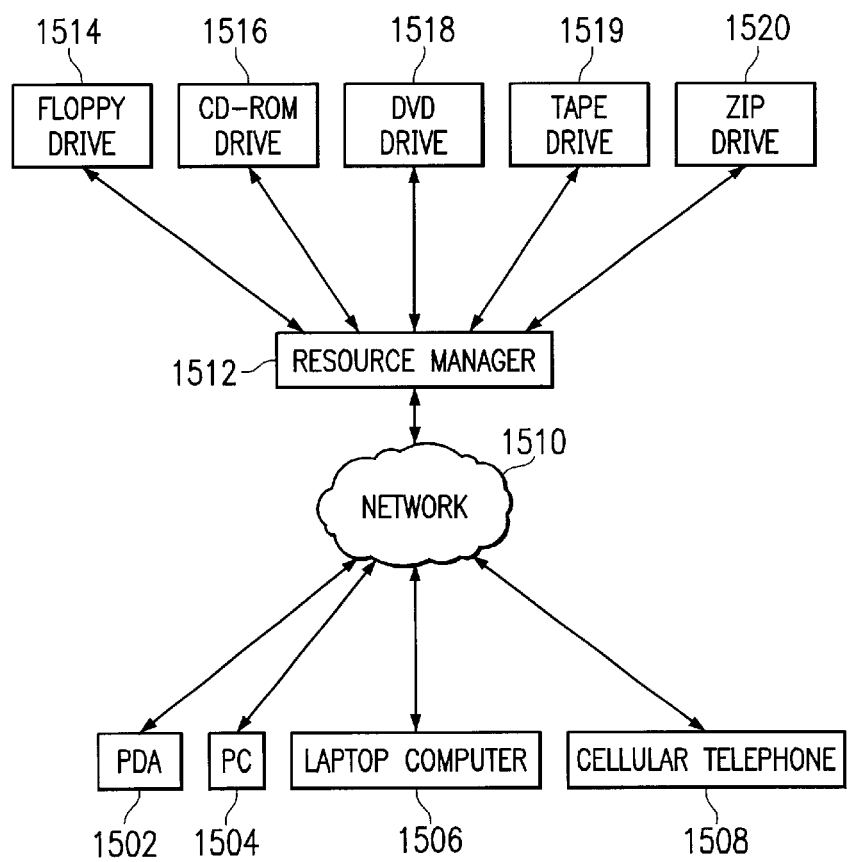
FIG. 6 illustrates an exemplary structure for identifying requests' flexibility and preferences.
FIG. 15 illustrates an exemplary computer environment in which a resource management scheme of the present invention may be implemented to manage data storage resources to service data storage requests received from various types of devices.

Methods other than that shown and described in conjunction with FIG. 5 may be implemented to indicate a request's flexibility/functionality and preferences. That is, a method other than sequentially numbering the functional capabilities of a request from most preferred to least preferred may be implemented, and any such implementation is intended to be within the scope of the present invention. For example, a requester's preferences may be identified as a particular time delay for each request. Turning to FIG. 6, an example of this alternative method for identifying requests' preferences is shown. For example, a request $R_1$ may be received which is capable of speaking both English and Spanish. Additionally, request $R_1$ may prefer to speak English over Spanish. Pool Control Logic 212 may identify the flexibility/functionality and preferences of request $R_1$ as shown in FIG. 6. That is, Pool Control Logic 212 may identify request $R_1$ as preferring to speak English by providing a 0 time delay for English in table 350, and as also being capable of speaking Spanish by providing a 30 second time delay for Spanish in table 350, corresponding respectively to request $R_1$.

Continuing with the exemplary table illustrated in FIG. 6, requests $R_2$ and $R_3$ may only speak Spanish and French, respectively. Pool Control Logic 212 may identify those requests' flexibility/functionality in table 350 by providing a 0 time delay in the appropriate column for each request. Request $R_4$ may speak both English and French, but prefer to speak French. Accordingly, Pool Control Logic 212 may identify request $R_4$ as preferring to speak French by providing a 0 time delay for French in table 350, and as also being capable of speaking English by providing a 30 second time delay for English in table 350, corresponding respectively to request $R_4$.

As a further example, request $R_5$ may speak both English and French and may have no preference between those languages. That is, request $R_5$ may not prefer one language (English or French) over the other. In a preferred embodiment, Pool Control Logic 212 may identify the request's flexibility/functionality and preference (or lack thereof) by providing a 0 time delay for both English and French in table 350 corresponding to request $R_5$. Thus, Pool Control Logic 212 may determine from table 350 that request $R_5$ is capable of speaking both English and French and does not prefer one language over the other. Taking this example a step further, suppose that request $R_6$ is capable of speaking English, French and Spanish. Further suppose that request $R_6$ prefers to speak English or French over Spanish, but does not have a preference between English and French. Pool Control Logic 212 may identify such flexibility/functionality and preference by providing a 0 time delay for both English and French in table 350, corresponding to request $R_6$. Pool Control Logic 212 may further identify the flexibility/functionality and preference of request $R_6$ by providing a 30 second time delay for Spanish in table 350, corresponding to request $R_6$.

Figure 7:
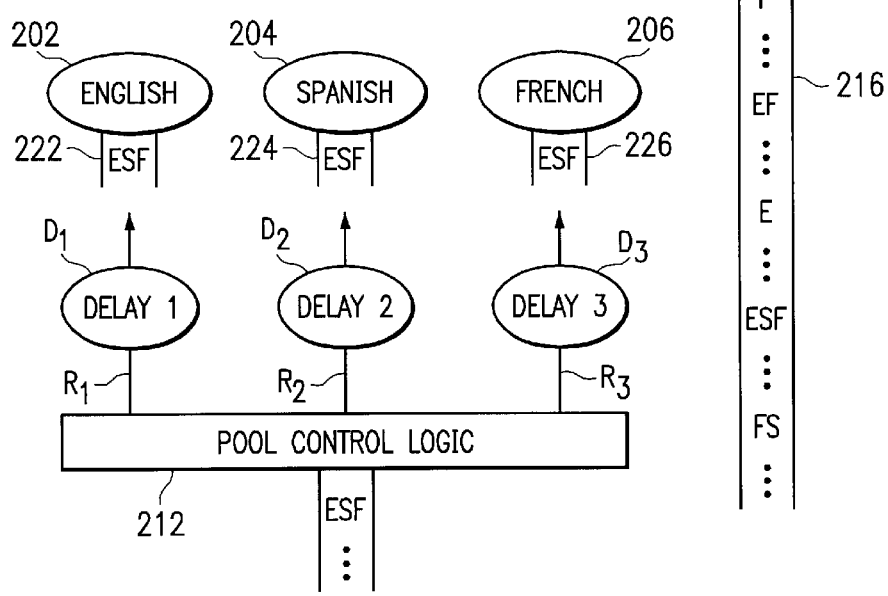
FIG. 7 illustrates an exemplary implementation of a preferred embodiment for allocating resources to a flexible request.

Turning now to FIG. 7, an example is illustrated for a preferred embodiment implemented in an ACD 200. As shown, a request "ESF" may be received from a flexible caller capable of speaking English, Spanish, and French. Pool Control Logic 212 determines that the caller is capable of speaking English, Spanish, and French, and then issues the appropriate requests to resource pools 202, 204, and 206 that are capable of servicing the request. Delays $D_1$, $D_2$ and $D_3$ may be utilized by Pool Control Logic 212 to further control how resources are allocated in response to the request's flexibility/functionality, preferences, and/or each resource's scarcity/value. For example, delays $D_1$, $D_2$ and $D_3$ may each be "0," such that there is no delay before issuing each request $R_1$, $R_2$ and $R_3$ in an attempt to obtain a resource for servicing the flexible caller ESF. In such case, requests $R_1$, $R_2$ and $R_3$ may be issued simultaneously and immediately in an attempt to obtain a resource capable of servicing flexible request ESF. Once a resource is obtained for either request $R_1$, $R_2$ or $R_3$, such resource may be allocated to service flexible caller ESF and the remaining pending requests are removed.

As a further example, suppose flexible caller ESF prefers to speak English, rather than Spanish or French, and prefers to speak Spanish, rather than French. In such case, delay $D_1$ may have value "0," such that a request $R_1$ is immediately made to English pool 202 for a preferred English speaking resource. Assuming that a resource is not immediately available to satisfy the request, the request may be queued in queue 222 for English pool 202. If after a determined time delay ($D_2$) a resource has not been obtained to service flexible caller ESF, request $R_2$ may be issued to Spanish pool 204 for a less preferred Spanish speaking resource. Assuming that a resource is not immediately available to satisfy request $R_2$, it may be queued in queue 224 for Spanish pool 204 and remain pending concurrently with request $R_1$. If after a further determined time delay ($D_3$) the flexible caller ESF is still not serviced, request $R_3$ may be issued to French pool 206 for a least preferred French speaking resource. Assuming that a resource is not immediately available to satisfy request $R_3$, it may be queued in queue 226 for French pool 206 and remain pending concurrently with requests $R_1$ and $R_2$. Thereafter, the first pool to produce an available resource capable of servicing flexible request ESF will be assigned to such flexible request ESF, and all of the other pending requests for request ESF will be removed. Accordingly, the delays $D_1$, $D_2$ and $D_3$ may be utilized to prioritize requests in accordance with a flexible requester's preference.

As still a further example, one or more of delays $D_1$, $D_2$ and $D_3$ may be used to prioritize the requests in accordance with a resource manager's preferences. That is, one or more of delays $D_1$, $D_2$ and $D_3$ may be implemented in a manner that first attempts to service the flexible caller ESF with less scarce/less valuable resources from pools 202, 204 and 206, before utilizing more scarce resources. For example, suppose English pool 202 has 10 resources, Spanish pool 204 has 5 resources, and French pool 206 has 2 resources. Pool Control Logic 212 may first attempt to service flexible request ESF with a resource from English pool 202 because that pool has the most resources that are capable of servicing the flexible request. Thus, delay D, may have value "0" to allow request $R_1$ to be immediately issued to pool 202. Assuming that a resource is not immediately available to service the request, the request may be queued in queue 222 for English pool 202.

If after a determined time delay ($D_2$) a resource is not obtained to service the flexible caller ESF, request $R_2$ may be issued to Spanish pool 204 for a more scarce/valuable Spanish speaking resource. Assuming that a Spanish speaking resource is not immediately available to service request $R_2$, it may be queued in queue 224 for Spanish pool 204 and remain pending concurrently with request $R_1$. If after a further determined time delay ($D_3$) the flexible caller ESF is still not serviced, request $R_3$ may be issued to French pool 206 for a more scarce/valuable French speaking resource. Assuming that a French speaking resource is not immediately available to service request $R_3$, it may be queued in queue 226 for French pool 206 and remain pending concurrently with requests $R_1$ and $R_2$. Thereafter, the first pool to produce an available resource capable of servicing flexible request ESF will be assigned to such flexible request ESF, and all of the other pending requests for flexible caller ESF will be removed.

As yet a further example, one or more of delays $D_1$, $D_2$ and $D_3$ may be utilized in a manner that balances the resource manager's desire to service a request with less scarce/less valuable resources from pools 202, 204 and 206 and a flexible requester's preferences. For example, suppose that flexible caller ESF can speak English, Spanish and French, but prefers to speak French over English and Spanish, and prefers to speak Spanish over English. Thus, the delays according to flexible caller ESF's preferences may be $D_1$=60 seconds for English pool 202, $D_2$=30 seconds for Spanish pool 204 and $D_3$=0 seconds for French pool 206. Further suppose that a resource manager prefers to utilize English resources, then Spanish resources, and lastly French resources.

One method of balancing the requester's preferences and the resource manager's preferences is to assign a percentage of consideration or weight to be given the flexible requester's preferences and the resource manager's preferences and calculate the time delays $D_1$, $D_2$ and $D_3$ accordingly. For example, suppose that the flexible requester's and resource manager's preferences are to be balanced equally (e.g., 50% each). The delay $D_1$ may be determined with the following formula: 0.5(user's preference)+0.5(resource manager's preference)=$D_1$. Applying such a formula in the above example we obtain the following for $D_1$: 0.5(60)+0.5(0)=30 seconds. Accordingly, a 30 second delay may be utilized before issuing a request to pool 202 for an English speaking resource.

Likewise, the delay $D_2$ may be determined with the following formula: 0.5(user's preference)+0.5(resource manager's preference)=$D_2$. Applying such a formula in the above example we obtain the following for $D_2$: 0.5(30)+0.5(30)=30 seconds. Accordingly, a 30 second delay may be utilized before issuing a request to pool 204 for a Spanish speaking resource. Similarly, the delay $D_3$ may be determined with the following formula: 0.5(user's preference)+0.5(resource manager's preference)=$D_3$. Applying such a formula in the above example we obtain the following for $D_3$: 0.5(0)+0.5(60)=30 seconds. Accordingly, a 30 second delay may be utilized before issuing a request to pool 206 for a French speaking resource. It should be noted that the formula used to calculate each delay in the above example compromises between the delays desired by the flexible requester and the delays desired by the resource manager. Other formulas or methods may be utilized to balance between the preferences of the requester and the resource manager, and any suitable formulas or methods are intended to be within the scope of the present invention. For instance, a formula may be utilized that always enables a request to be immediately made for some resource pool (i.e., always results in at least one of delays $D_1$, $D_2$, and $D_3$ being 0), rather than potentially delaying all requests.

Figure 8A:
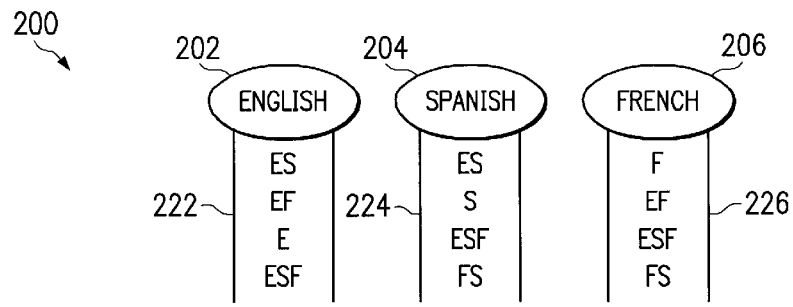
FIGS. 8A and 8B illustrate a further exemplary implementation of a preferred embodiment for allocating resources to flexible requests.
Figure 8B:
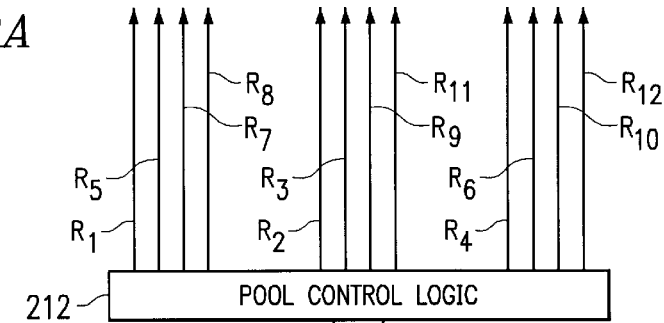

Turning to FIGS. 8A and 8B, a further example is shown of a preferred embodiment implemented in an ACD 200. As shown in FIG. 8A, requests may be received and queued for Pool Control Logic 212 in queue 216. For example, request ES from a flexible requester capable of speaking both English and Spanish may be received. In response, Pool Control Logic 212 may issue requests $R_1$ and $R_2$ simultaneously in an attempt to obtain a resource from English pool 202 or Spanish pool 204 to service request ES. If a resource is not immediately available from either of pools 202 or 204, a request for flexible caller ES may be queued in queues 222 and 224, as shown in FIG. 8A. Pool Control Logic 212 may then receive inflexible request S capable of speaking only Spanish. In response, Pool Control Logic 212 may issue request $R_3$ to Spanish pool 204 in an attempt to obtain a resource capable of servicing inflexible request S. If a resource is not immediately available from pool 204, a request for inflexible caller S may be queued behind the pending request for caller ES in queue 224, as shown in FIG. 8A. Pool Control Logic may then receive inflexible request F capable of speaking only French. In response, Pool Control Logic 212 may issue request $R_4$ to French pool 206 in an attempt to obtain a resource capable of servicing inflexible request F. If a resource is not immediately available from pool 206, a request for inflexible caller F may be queued in queue 226, as shown in FIG. 8A.

Pool Control Logic 212 may then receive flexible request EF from a requester capable of speaking both English and French. In response, Pool Control Logic 212 may issue requests $R_5$ and $R_6$ simultaneously in an attempt to obtain a resource from English pool 202 or French pool 206 to service flexible request EF. If a resource is not immediately available from either of pools 202 or 206, a request for flexible caller EF may be queued in queues 222 and 226, as shown in FIG. 8A. Pool Control Logic 212 may then receive inflexible request E from a requester capable of speaking only English. In response, Pool Control Logic 212 may issue request $R_7$ to English pool 202 in an attempt to obtain a resource capable of servicing inflexible request E. If a resource is not immediately available from pool 202, a request for inflexible caller E may be queued in queue 222, as shown in FIG. 8A. Pool Control Logic 212 may then receive flexible request ESF from a requester capable of speaking English, Spanish and French. In response, Pool Control Logic 212 may issue requests $R_8$, $R_9$ and $R_{10}$ simultaneously in an attempt to obtain a resource from English pool 202, Spanish pool 204 or French pool 206 to service flexible request ESF. If a resource is not immediately available from either of pools 202, 204, or 206, a request for flexible caller ESF may be queued in queues 222, 224, and 226, as shown in FIG. 8A. Pool Control Logic 212 may then receive flexible request FS from a requester capable of speaking both French and Spanish. In response, Pool Control Logic 212 may issue requests $R_{11}$, and $R_{12}$ simultaneously in an attempt to obtain a resource from Spanish pool 204 or French pool 206 to service flexible request FS. If a resource is not immediately available from either of pools 204 or 206, a request for flexible caller FS may be queued in queues 224 and 226, as shown in FIG. 8A.

Preferably, once a resource becomes available to service a pending request, it begins to service such request and all concurrently pending requests corresponding thereto are removed from the queues. For instance, suppose that once all of the requests described in the above example are received and are pending in queues 222, 224, and 226 as shown in FIG. 8A that an English resource becomes available from pool 202. Such available English resource would preferably service the longest pending request from queue 222, which in the example of FIG. 8A is an ES request (i.e., the ES request that was placed into queue 222 from request $R_1$). Once the English resource begins to service such ES request, it would be removed from queue 222, and the next longest pending request (i.e., request EF in the example of FIG. 8A) in such queue would become the next to be serviced in that queue. The result of such request ES of FIG. 8A being serviced is shown in FIG. 8B, wherein such request ES has been removed from queue 222. As further shown in FIG. 8B, the corresponding concurrently pending request's for the serviced request are likewise removed from their queues. For instance, request ES has been removed from queue 224 since a resource from pool 202 has committed to servicing the caller corresponding to such ES request.

Figure 9:
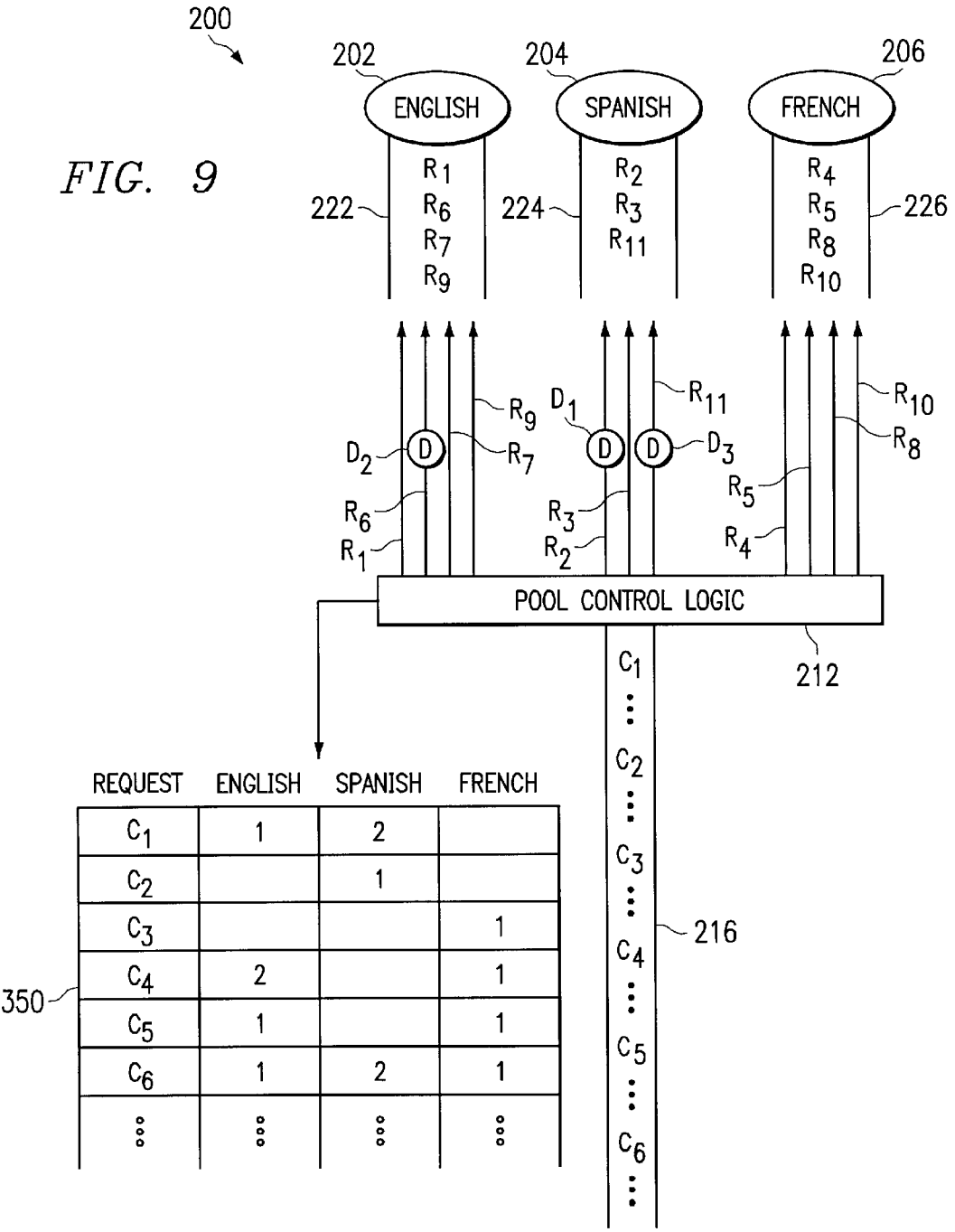
FIG. 9 illustrates an exemplary implementation of a preferred embodiment for allocating resources to flexible requests in accordance with the requests' preferences.

Turning to FIG. 9, a further example is illustrated for a preferred embodiment implemented in an ACD 200, in which requests are issued in accordance with flexible requesters' preferences. As shown, requests may be received and queued for Pool Control Logic 212 in queue 216. As further shown, Pool Control Logic 212 may access table 350 that contains the multi-flexibility/functionality and preferences for each request. For example, Pool Control Logic 212 may receive request C, from a caller. Pool Control Logic 212 may access table 350 and determine that caller $C_1$ speaks both English and Spanish, but prefers to speak English. In response, Pool Control Logic 212 may immediately issue a request $R_1$ to English pool 202 in an attempt to obtain a preferred resource to service request $C_1$. If a resource is not immediately available from English pool 202, request $R_1$ for caller C, may be queued in queue 222 for English pool 202. If after a determined time delay $D_1$ the request $R_1$ has not been serviced, Pool Control Logic 212 may issue request $R_2$ to Spanish pool 204 in an attempt to obtain a less preferred resource to service caller $C_1$. If a resource is not immediately available from Spanish pool 204, request $R_2$ for caller $C_1$ may be queued in queue 224 for Spanish pool 204 and remain pending concurrently with request $R_1$ for caller $C_1$. The first resource to become available from either English pool 202 or Spanish pool 204 may be assigned to service caller $C_1$ and the remaining pending request for caller $C_1$ will be removed.

Pool Control Logic 212 may then receive request $C_2$ from a caller. Pool Control Logic 212 may access table 350 and determine that caller $C_2$ speaks only Spanish. In response, Pool Control Logic 212 may immediately issue a request $R_3$ to Spanish pool 204 in an attempt to obtain a resource to service inflexible request $C_2$. If a resource is not immediately available from Spanish pool 204, request $R_3$ for caller $C_2$ may be queued in queue 224 for Spanish pool 204. When a resource becomes available from Spanish pool 204 to service caller $C_2$, it may be assigned to service caller $C_2$.

Pool Control Logic 212 may then receive request $C_3$ from a caller. Pool Control Logic 212 may access table 350 and determine that caller $C_3$ speaks only French. In response, Pool Control Logic 212 may immediately issue a request $R_4$ to French pool 206 in an attempt to obtain a resource to service inflexible request $C_3$. If a resource is not immediately available from French pool 206, request $R_4$ for caller $C_3$ may be queued in queue 226 for French pool 206. When a resource becomes available from French pool 206 to service inflexible caller $C_3$, it may be assigned to caller $C_3$.

Pool Control Logic 212 may then receive request $C_4$ from a caller. Pool Control Logic 212 may access table 350 and determine that caller $C_4$ speaks both English and French, but prefers to speak French. In response, Pool Control Logic 212 may immediately issue a request $R_5$ to French pool 206 in an attempt to obtain a preferred resource to service flexible request $C_4$. If a resource is not immediately available from French pool 206, request $R_5$ for caller $C_4$ may be queued in queue 226 for French pool 206. If after a determined time delay $D_2$ the request $R_5$ has not been serviced, Pool Control Logic 212 may issue request $R_6$ to English pool 202 in an attempt to obtain a less preferred resource to service flexible caller $C_4$. If a resource is not immediately available from English pool 202, request $R_6$ for caller $C_4$ may be queued in queue 222 for English pool 202 and remain pending concurrently with request $R_5$ for caller $C_4$. When a resource becomes available from either English pool 202 or French pool 206 to service caller $C_4$, it may be assigned to caller $C_4$ and the remaining pending request for caller $C_4$ will be removed.

Pool Control Logic 212 may then receive request $C_5$ from a caller. Pool Control Logic 212 may access table 350 and determine that caller $C_5$ speaks both English and Spanish, and has no preference between the two languages. In response, Pool Control Logic 212 may immediately issue requests $R_7$ and $R_8$ respectively to English pool 202 and French pool 206 in an attempt to obtain a resource to service flexible request $C_5$. If a resource is not immediately available from either pool 202 or 206, requests $R_7$ and $R_8$ for caller $C_5$ may be queued respectively in queues 222 and 226 and remain concurrently pending. When a resource becomes available from either English pool 202 or French pool 206 to service caller $C_5$, it may be assigned to flexible caller $C_5$ and the remaining pending request for caller $C_5$ will be removed.

Pool Control Logic 212 may then receive request $C_6$ from a caller. Pool Control Logic 212 may access table 350 and determine that caller $C_6$ speaks English, Spanish and French. Pool Control Logic 212 may further determine from table 350 that caller $C_6$ prefers to speak English and French over Spanish, and has no preference as to English and French. In response, Pool Control Logic 212 may immediately issue requests $R_9$ and $R_{10}$ respectively to English pool 202 and French pool 206 in an attempt to obtain a preferred resource to service flexible request $C_6$. If a resource is not immediately available from pool 202 or pool 206, requests $R_9$ and $R_{10}$ for caller $C_6$ may be queued respectively in queues 222 and 226. If after a determined time delay $D_3$ the flexible request $C_6$ has not been serviced, Pool Control Logic 212 may issue request $R_{11}$ to Spanish pool 204 in an attempt to obtain a less preferred resource to service caller $C_6$. If a resource is not immediately available from Spanish pool 204, request $R_{11}$ for caller $C_6$ may be queued in queue 224 for Spanish pool 204 and remain pending concurrently with requests $R_9$ and $R_{10}$ for caller $C_6$. When a resource becomes available from either English pool 202, Spanish pool 204 or French pool 206 to service caller $C_6$, it may be assigned to caller $C_6$ and the remaining pending requests for caller $C_6$ will be removed.

Figure 10:
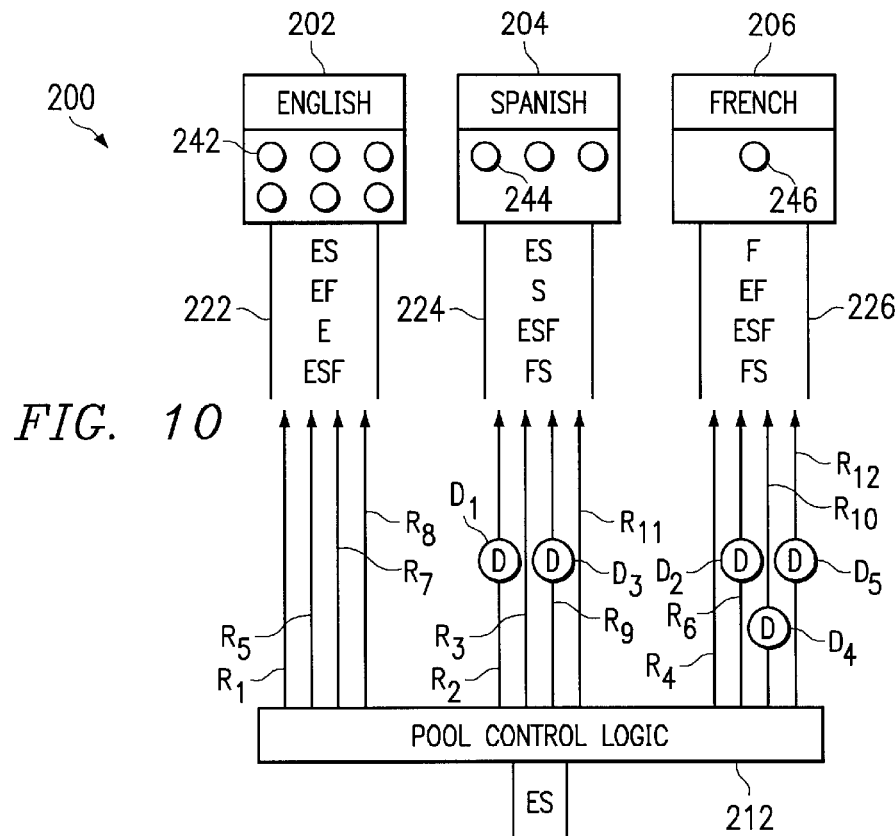
FIG. 10 illustrates an exemplary implementation of a preferred embodiment for allocating resources to flexible requests in accordance with the resource manager's preferences.

Turning now to FIG. 10, another example of a preferred embodiment implemented in an ACD 200 is illustrated, in which resources are managed in accordance with a resource manager's preferences. As shown, requests for service by a resource may be received and queued for Pool Control Logic 212 in queue 216. As further shown, resources 242, 244 and 246 exist in pools 202, 204 and 206, respectively. For example, 6 resources 242 may exist in English pool 202, 3 resources 244 may exist in Spanish pool 204, and 1 resource 246 may exist in French pool 206. Pool Control Logic 212 may receive flexible request ES from a requester capable of speaking both English and Spanish. In response, Pool Control Logic 212 may immediately make a request $R_1$ to English pool 202 because English pool 202 is the pool with the most resources capable of servicing request ES. If an English resource 242 is not immediately available, the request may be queued in queue 222 for English pool 202. If after a determined time delay $D_1$ the caller ES is not serviced, Pool Control Logic 212 may issue request $R_2$ for a more scarce resource 244 from Spanish pool 204. If a resource 244 is not immediately available from Spanish pool 204, the request may be queued in queue 224 and remain pending concurrently with the request for English pool 202. When a resource becomes available from one of the pools 202 or 204, that resource may be assigned to service caller ES and the remaining pending request will be removed.

Pool Control Logic 212 may then receive request S from a requester capable of speaking only Spanish. In response, Pool Control Logic 212 may immediately make a request $R_3$ to Spanish pool 204 to attempt to obtain a resource 244 capable of servicing inflexible request S. If a Spanish resource 244 is not immediately available, the request $R_3$ may be queued in queue 224 for Spanish pool 204. When a resource becomes available from Spanish pool 204 to service request S, that resource may be assigned to request S.

Pool Control Logic 212 may then receive request F from a requester capable of speaking only French. In response, Pool Control Logic 212 may immediately make a request $R_4$ to French pool 206 to attempt to obtain a resource 246 capable of servicing inflexible request F. If a French resource 246 is not immediately available, the request $R_4$ may be queued in queue 226 for French pool 206. When a resource becomes available from French pool 206 to service request F, that resource may be assigned to request F.

Pool Control Logic 212 may then receive flexible request EF from a requester capable of speaking both English and French. In response, Pool Control Logic 212 may immediately make a request $R_5$ to English pool 202 because English pool 202 is the pool with the most resources capable of servicing request EF. If an English resource 242 is not immediately available, the request $R_5$ may be queued in queue 222 for English pool 202. If after a determined time delay $D_2$ the flexible caller EF remains unsatisfied, Pool Control Logic 212 may issue request $R_6$ for a more scarce resource 246 from French pool 206. If a resource 246 is not immediately available from French pool 206, the request $R_6$ may be queued in queue 226 and remain pending concurrently with the request for English pool 202. When a resource becomes available from one of the pools 202 or 206 to service flexible caller EF, the available resource may be assigned to flexible caller EF and the remaining pending request will be removed.

Pool Control Logic 212 may then receive request E from a requester capable of speaking only English. In response, Pool Control Logic 212 may immediately make a request $R_7$ to English pool 202 to attempt to obtain a resource 242 capable of servicing inflexible request E. If an English resource 242 is not immediately available, the request may be queued in queue 222 for English pool 202. When a resource becomes available from English pool 202 to service request E, that resource may be assigned to request E.

Pool Control Logic 212 may then receive request ESF from a flexible requester capable of speaking English, Spanish and French. In response, Pool Control Logic 212 may immediately make a request $R_8$ to English pool 202 because English pool 202 is the pool with the most resources capable of servicing request ESF. If an English resource 242 is not immediately available, the request $R_8$ may be queued in queue 222 for English pool 202. If after a determined time delay $D_3$ the flexible caller ESF has not been serviced, Pool Control Logic 212 may issue request $R_9$ for a more scarce resource 244 from Spanish pool 204. If a resource 244 is not immediately available from Spanish pool 204, the request $R_8$ may be queued in queue 224 and remain pending concurrently with request $R_8$ for English pool 202. If after a determined time delay $D_4$ the flexible caller ESF is still not serviced, Pool Control Logic 212 may issue request $R_{10}$ for an even more scarce resource 246 from French pool 206. If a resource 246 is not immediately available from French pool 206, the request $R_{10}$ may be queued in queue 226 and remain pending concurrently with requests $R_8$ and $R_9$. When a resource becomes available from one of the pools 202, 204 or 206 to service flexible caller ESF, the available resource may be assigned to service flexible caller ESF and the remaining pending requests will be removed.

Pool Control Logic 212 may then receive request FS from a flexible requester capable of speaking both Spanish and French. In response, Pool Control Logic 212 may immediately make a request $R_{11}$ to Spanish pool 204 because Spanish pool 204 is the pool with the most resources capable of servicing request FS. If a Spanish resource 244 is not immediately available, the request $R_{11}$ may be queued in queue 224 for Spanish pool 204. If after a determined time delay $D_5$ the flexible caller FS is not serviced, Pool Control Logic 212 may issue request $R_{11}$ for a more scarce resource 246 from French pool 206. If a resource 246 is not immediately available from French pool 206, the request $R_{12}$ may be queued in queue 226 and remain pending concurrently with request $R_{11}$. When a resource becomes available from one of the pools 204 or 206 to service request FS, the available resource may be assigned to service flexible caller FS and the remaining pending request will be removed.

Figure 11:
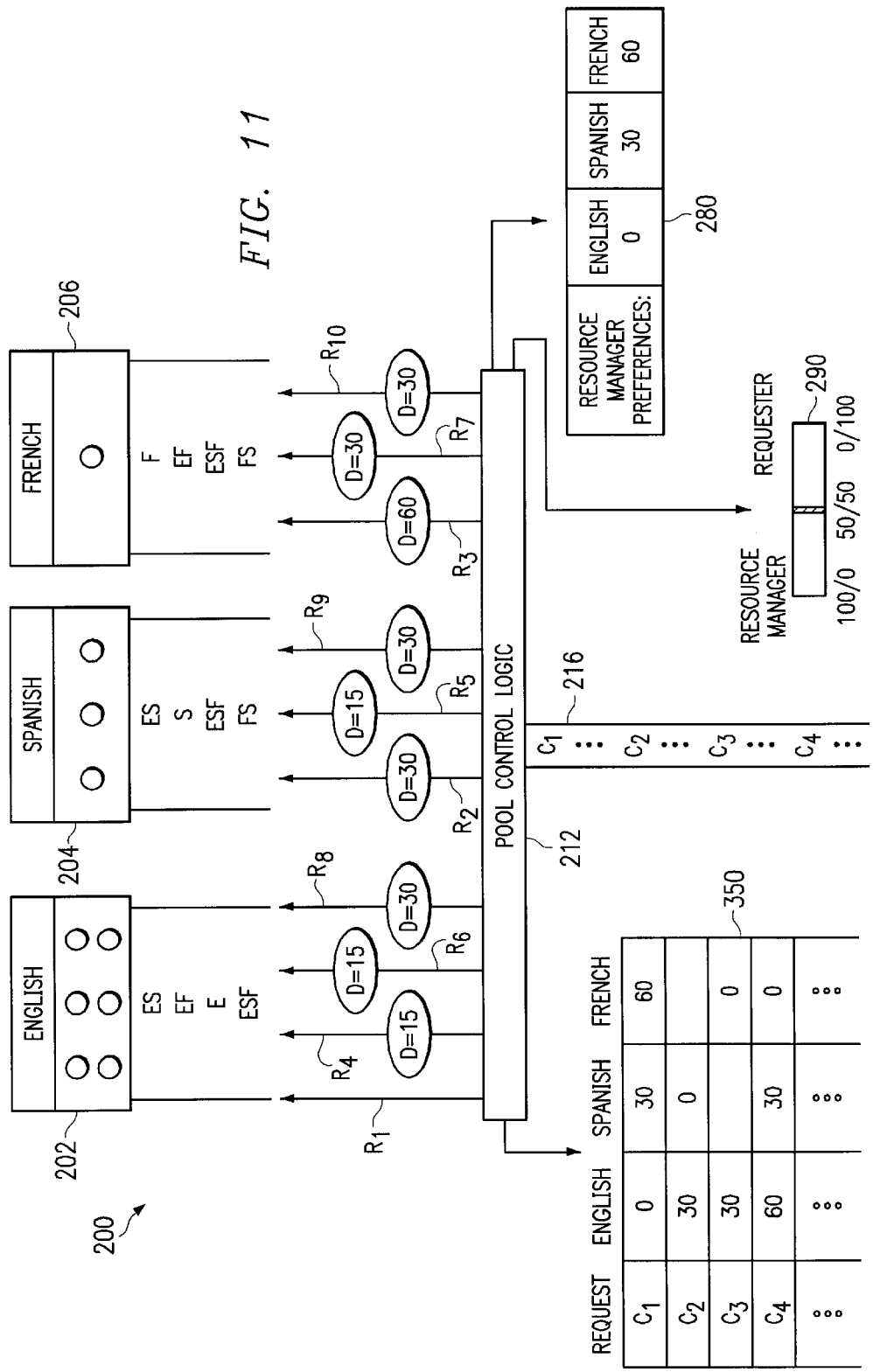
FIG. 11 illustrates an exemplary implementation of a preferred embodiment for allocating resources to flexible requests by balancing the requests' preferences and the resource manager's preferences.

Turning now to FIG. 11, another example of a preferred embodiment implemented in an ACD 200 is illustrated, in which flexible requests' preferences and the resource manager's preferences are balanced. As shown, requests for service by a resource may be received and queued for Pool Control Logic 212 in queue 216. As further shown, resources 242, 244 and 246 may exist in pools 202, 204 and 206, respectively. Table 350 may identify each request's flexibility/functionality and preferences as delays. As discussed previously, other methods may be utilized to identify each request's flexibility/functionality and preferences. Also, table 280 may represent the resource manager's preferences.

For example, suppose that the resource manager's preference is to first attempt to satisfy a flexible request with English pool 202, then with Spanish pool 204 after a 30 second delay, and finally with French pool 206 after a 60 second delay. Further suppose that flexible caller $C_1$ is received in queue 216. Pool Control Logic 212 may access table 350 and determine that caller C, can speak English, Spanish and French. Pool Control Logic 212 may further determine based on the delay values provided in table 350 that flexible caller $C_1$ prefers to speak English over Spanish and French, and prefers to speak Spanish over French. One method for balancing a request's preferences with the resource manager's preferences is by summing a percentage of the delay that each desires. The percentages may be thought of as the weight or amount of consideration to be given to each preference.

Such percentages may be illustrated as a sliding scale 290. As scale 290 illustrates, on one end of the scale only the resource manager's preferences are considered (e.g., resource manager's preferences weighted 100% and request's preferences weighted 0%). On the opposite end of the scale only the request's preferences are considered (e.g., resource manager's preferences weighted 0% and request's preferences weighted 100%). In the middle of the scale the competing preferences are weighted equally (e.g., resource manager's preferences weighted 50% and request's preferences weighted 50%). A scale (or other interactive structure) may be provided to a user to allow a user to interact with the system and set the desired percentages. Accordingly, the percentages may be predetermined by a user, the Pool Control Logic 212 or the resource pools. Alternatively, the percentages may be determined in real-time by the Pool Control Logic 212 or resource pools. Continuing with the ACD example, the Pool Control Logic 212 or resource pools may adjust the percentages to give more weight to flexible requester's preferences when call volume is low, and the Pool Control Logic 212 or resource pools may adjust the percentages to give more weight to the resource manager's preferences as the call volume increases.

Suppose that the flexible requester's preferences and resource manager's preferences are to be weighted equally (as shown by scale 290 in FIG. 11). One method for determining a delay that balances the resource manager's and flexible requester's preferences each 50% is by utilizing the formula: 0.5(requester's preference)+0.5(resource manager's preference)=Delay. Applying such formula in the above example to determine the delay to be utilized for English pool 202 for caller $C_1$ results in 0.5(0)+0.5(0)=0 second delay for English pool 202 for caller $C_1$. Accordingly, Pool Control Logic 212 may immediately issue request $R_1$ to English pool 202 for caller $C_1$ with no delay.

Similarly, the formula may be applied to determine the delay to be utilized for Spanish pool 204, which results in 0.5(30)+0.5(30)=30 second delay for Spanish pool 204 for caller $C_1$. Accordingly, Pool Control Logic 212 may issue a request $R_2$ to Spanish pool 204 for caller $C_1$ if $C_1$ is not serviced within 30 seconds. Further, the formula may be applied to determine the delay to be utilized for French pool 206, which results in 0.5(60)+0.5(60)=60 second delay for French pool 206 for caller $C_1$. Accordingly, Pool Control Logic 212 may issue a request $R_3$ to French pool 206 for caller $C_1$ if $C_1$ is not serviced within 60 seconds. It should be noted that in this example caller $C_1$'s preferences and the resource manager's preferences are identical. That is, both the requester $C_1$ and the resource manager prefer English, then Spanish, and then French. As a result, when balancing the preferences, requests are issued in a manner desired by both the requester and the resource manager (e.g., first to English pool 202, then to Spanish pool 204, and then to French pool 206).

Continuing with the example illustrated in FIG. 11, flexible caller $C_2$ may next be received. Pool Control Logic 212 may access table 350 and determine that caller $C_2$ can speak both English and Spanish. Pool Control Logic 212 may further determine based on the delay values provided in table 350 that caller $C_2$ prefers to speak Spanish over English. Again, assuming that the requester's preferences and resource manager's preferences are to be weighted equally, the following formula may be utilized: 0.5 (requester's preference)+0.5(resource manager's preference)=Delay. Applying such formula to determine the delay to be utilized for English pool 202 for caller $C_2$ results in 0.5(30)+0.5(0)=15 second delay for English pool 202 for caller $C_2$. Accordingly, Pool Control Logic 212 may issue request $R_4$ to English pool 202 for caller $C_2$ after a 15 second delay.

Similarly, the delay to be utilized for Spanish pool 204 for caller $C_2$ may be determined as 0.5(0)+0.5(30)=15 second delay for Spanish pool 204 for caller $C_1$. Accordingly, Pool Control Logic 212 may issue a request $R_5$ to Spanish pool 204 for caller $C_2$ after a 15 second delay. It should be noted that in this example caller $C_2$'s preferences and the resource manager's preferences are conflicting. That is, the requester $C_2$ prefers Spanish first, then English, and the resource manager prefers to utilize English first, then Spanish. As a result, when balancing the preferences equally, requests are issued in a manner that compromises between the delays desired by the requester and those desired by the resource manager (e.g., a 15 second delay is imposed before issuing requests to either English pool 202 or Spanish pool 204). Of course, other balancing methods may be implemented, and any such balancing scheme is intended to be within the scope of the present invention.

Flexible caller $C_3$ may next be received in queue 216. Pool Control Logic 212 may access table 350 and determine that caller $C_3$ can speak both English and French. Pool Control Logic 212 may further determine based on the delay values provided in table 350 that caller $C_3$ prefers to speak French over English. Again, assuming that the request's preferences and resource manager's preferences are to be weighted equally, formula 0.5(request's preference)+0.5 (resource manager's preference)=Delay may be utilized. Applying such formula to determine the delay to be utilized for English pool 202 for caller $C_3$ results in 0.5(30)+0.5(0)= 15 second delay for English pool 202 for caller $C_3$. Accordingly, Pool Control Logic 212 may issue request $R_6$ to English pool 202 for caller $C_3$ after a 15 second delay.

Similarly, the delay to be utilized for French pool 206 for caller $C_3$ may be determined as 0.5(0)+0.5(60)=30 second delay for French pool 206 for caller $C_3$. Accordingly, Pool Control Logic 212 may issue a request $R_7$ to French pool 206 for caller $C_3$ if $C_3$ is not serviced within 30 seconds. It should be noted that in this example caller $C_3$'s preferences and the resource manager's preferences are conflicting. That is, the requester $C_3$ prefers French first, then English, and the resource manager prefers to utilize English first, then French. As a result, when balancing the preferences equally, requests are issued in a manner that compromises between the delays desired by the requester and those desired by the resource manager (e.g., a 15 second delay is imposed before issuing a request to English pool 202 and a 30 second delay is imposed before issuing a request to French pool 206).

Flexible caller $C_4$ may next be received in queue 216. Pool Control Logic 212 may access table 350 and determine that caller $C_4$ can speak English, Spanish and French. Pool Control Logic 212 may further determine based on the delay values provided in table 350 that caller $C_4$ prefers to speak French over English and Spanish, and prefers to speak Spanish over English. Again, assuming that the request's preferences and resource manager's preferences are to be weighted equally, formula 0.5(request's preference)+0.5 (resource manager's preference)=Delay may be utilized. Applying such formula to determine the delay to be utilized for English pool 202 for caller $C_4$ results in 0.5(60)+0.5(0)= 30 second delay for English pool 202 for caller $C_4$. Accordingly, Pool Control Logic 212 may issue request $R_8$ to English pool 202 for caller $C_4$ after a 30 second delay.

Similarly, the delay to be utilized for Spanish pool 204 for caller $C_4$ may be determined as 0.5(30)+0.5(30)=30 second delay for Spanish pool 204 for caller $C_4$. Accordingly, Pool Control Logic 212 may issue a request $R_9$ to Spanish pool 204 for caller $C_4$ after a 30 second delay. Likewise, the delay to be utilized for French pool 206 for caller $C_4$ may be determined as 0.5(0)+0.5(60)=30 second delay for French pool 206 for caller $C_4$. Accordingly, Pool Control Logic 212 may issue a request $R_{10}$ to French pool 206 for caller $C_4$ after a 30 second delay. It should be noted that in this example caller $C_4$'s preferences and the resource manager's preferences are in direct conflict. That is, the requester $C_4$ prefers French first, then Spanish, then English, and the resource manager prefers to utilize English resources first, then Spanish, then French. As a result, when balancing the preferences equally, requests are issued in a manner that compromises between the delays desired by the requester and those desired by the resource manager (e.g., a 30 second delay is imposed before issuing a request to English pool 202, Spanish pool 204 and French pool 206).

A preferred embodiment of the present invention may be implemented in a system having multi-functional resources, as disclosed in co-pending and commonly assigned U.S. patent application Ser. No. 09/330,258 entitled "ALLOCATION OF MULTI-FUNCTION RESOURCES." For example, as disclosed in U.S. patent application Ser. No. 09/330,258, resources may be grouped into homogeneous pools, such that resources in each pool are "pure" as to functional capability. A homogeneous pool described as being "pure" indicates that the resources within the pool all share one or more common functional capabilities, from the perspective of the requesters and the Homogeneous Pool Control. The resources in a given homogeneous pool may have additional disparate characteristics that are not relevant to satisfying requests, but they are grouped together because they share one or more functional capabilities relevant to satisfying requests.

Figure 12:
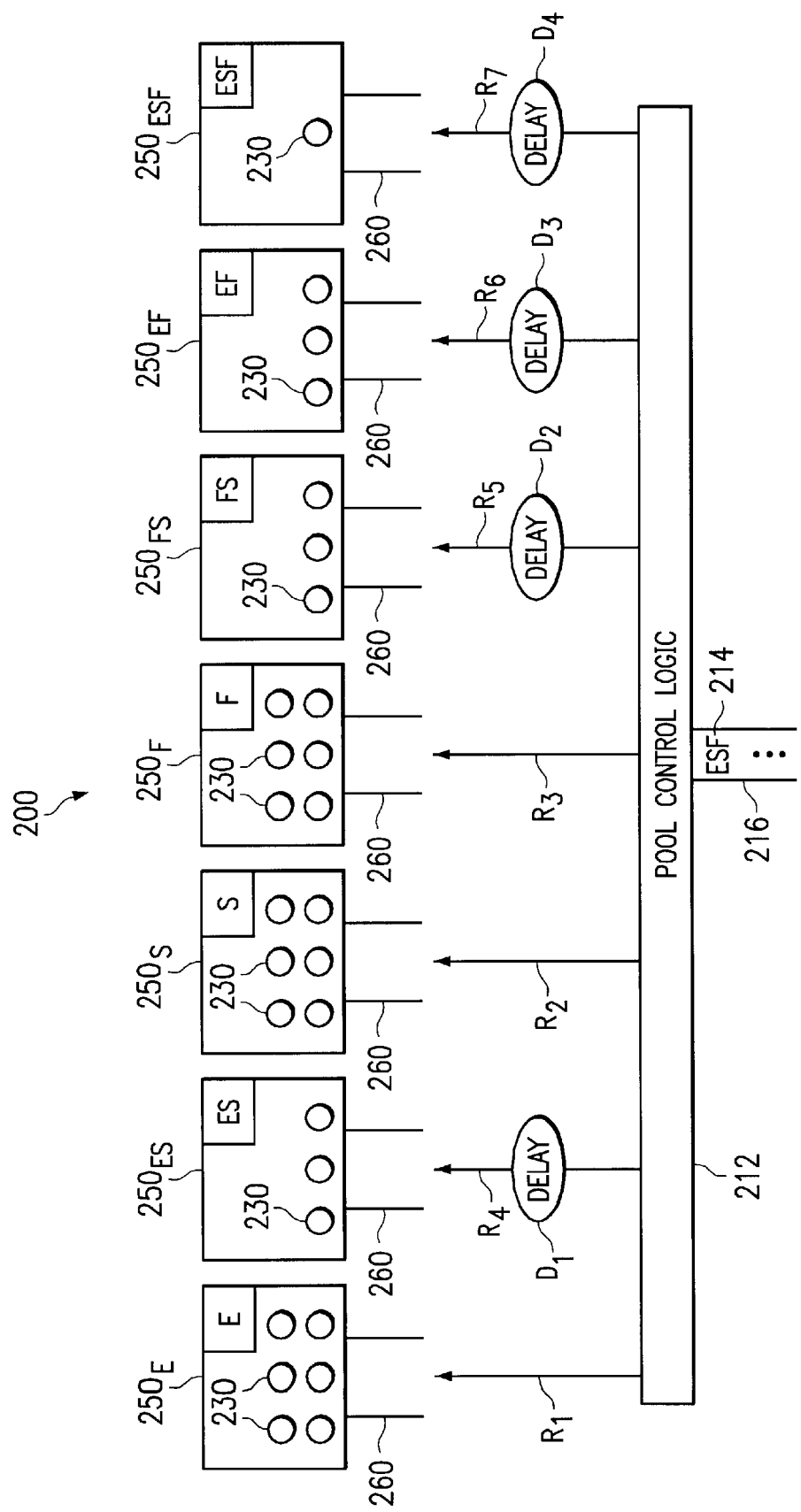
FIG. 12 illustrates an exemplary implementation of a preferred embodiment for allocating multi-functional resources to flexible requests.

Turning to FIG. 12, an example of a preferred embodiment implemented in an ACD 200 having some resources with multi-functionality (e.g., capable of speaking more than one language) is illustrated. As shown in FIG. 12, the resources 230 may be grouped into homogeneous pools 250. For example, resources 230 capable of speaking only English may be grouped into pool $250_E$, resources 230 capable of speaking only Spanish may be grouped into pool $250_S$, resources 230 capable of speaking only French may be grouped into pool $250_F$, resources 230 capable of speaking both English and Spanish may be grouped into pool $250_{ES}$, resources 230 capable of speaking both French and Spanish may be grouped into pool $250_{FS}$, resources 230 capable of speaking both English and French may be grouped into pool $250_{EF}$, and resources capable of speaking English, French and Spanish may be grouped into pool $250_{ESF}$.

As discussed in greater detail in co-pending U.S. patent application Ser. No. 09/330,258 entitled "ALLOCATION OF MULTI-FUNCTION RESOURCES," pools $250_E$, $250_S$ and $250_F$ may be considered primary level pools. Such primary pools may have less value/less flexibility/less functionality than the other pools. As illustrated by the exemplary ACD shown in FIG. 12, the resources 230 contained in such pools may be capable of speaking only one language. Pools $250_{ES}$, $250_{EF}$ and $250_{FS}$ may be considered secondary level pools. Such secondary pools may have more value/more flexibility/more functionality than the primary pools. As illustrated by the exemplary ACD shown in FIG. 12, the resources 230 contained in such pools may be bi-lingual. Pool $250_{ESF}$ may be considered a tertiary level pool. Such tertiary level pool may have more value/more flexibility/more functionality than the primary and secondary pools. As illustrated by the exemplary ACD shown in FIG. 12, the resources 230 contained in pool $250_{ESF}$ may be tri-lingual.

As further shown in FIG. 12, request ESF may be received from a flexible caller capable of speaking English, Spanish and French. Pool Control Logic 212 may recognize that the requester is capable of speaking all three languages and immediately issue requests $R_1$, $R_2$ and $R_3$ to the primary level pools $250_E$, $250_S$ and $250_F$, respectively. That is, because the primary level pools $250_E$, $250_S$ and $250_F$ may be less valuable/less flexible than the other pools, it may be desirable to first attempt to satisfy flexible request ESF with a resource from one of such primary level pools.

If a resource is not immediately available to satisfy flexible request ESF from pools $250_E$, $250_S$ or $250_F$, requests $R_1$, $R_2$ and $R_3$ may be queued in queues 260 for their respective pools and remain concurrently pending. If after a determined time flexible request ESF remains unsatisfied, Pool Control Logic 212 may issue requests $R_4$, $R_5$ and $R_6$ to secondary level pools $250_{ES}$, $250_{FS}$ and $250_{EF}$, respectively. That is, if after time delays $D_1$, $D_2$ and $D_3$ flexible request ESF remains unsatisfied, Pool Control Logic 212 may issue requests $R_4$, $R_5$ and $R_6$ to the more valuable/more flexible secondary level pools. Thus, Pool Control Logic 212 may attempt to utilize more valuable/more flexible secondary level pools to satisfy flexible request ESF if the flexible request has not been satisfied within a determined time period by a resource from one of the primary level pools.

If a resource is not immediately available to satisfy flexible request ESF from secondary pools $250_{ES}$, $25_{FS}$ or $250_{EF}$, requests $R_4$, $R_5$ and $R_6$ may be queued in queues 260 for their respective pools and remain concurrently pending with previously issued requests $R_1$, $R_2$ and $R_3$. If after a further determined time flexible request ESF remains unsatisfied, Pool Control Logic 212 may issue request $R_7$ to tertiary level pool $250_{ESF}$. That is, if after time delay $D_4$ flexible request ESF remains unsatisfied, Pool Control Logic 212 may issue request $R_7$ to the even more valuable/more flexible tertiary level pool. Thus, Pool Control Logic 212 may attempt to utilize more valuable/more flexible tertiary level pools to satisfy flexible request ESF if the request has not been satisfied within a determined time period by a resource from one of the primary or secondary level pools.

As the above-example demonstrates, the flexibility of a request may be taken into account to attempt to utilize less valuable/less flexible resources to satisfy the request, while still attempting to satisfy the request in a timely manner. By utilizing the flexibility of a request, multiple requests may be issued on the primary level to less valuable/less flexible resources in an attempt to obtain a resource to satisfy the request. Accordingly, the chances of satisfying the request with such a less valuable/less flexible resource are increased. Additionally, the overall amount of time before a flexible request is satisfied may be reduced because requests may be issued to multiple types of resource pools to try to satisfy such a flexible request.

Figure 13:
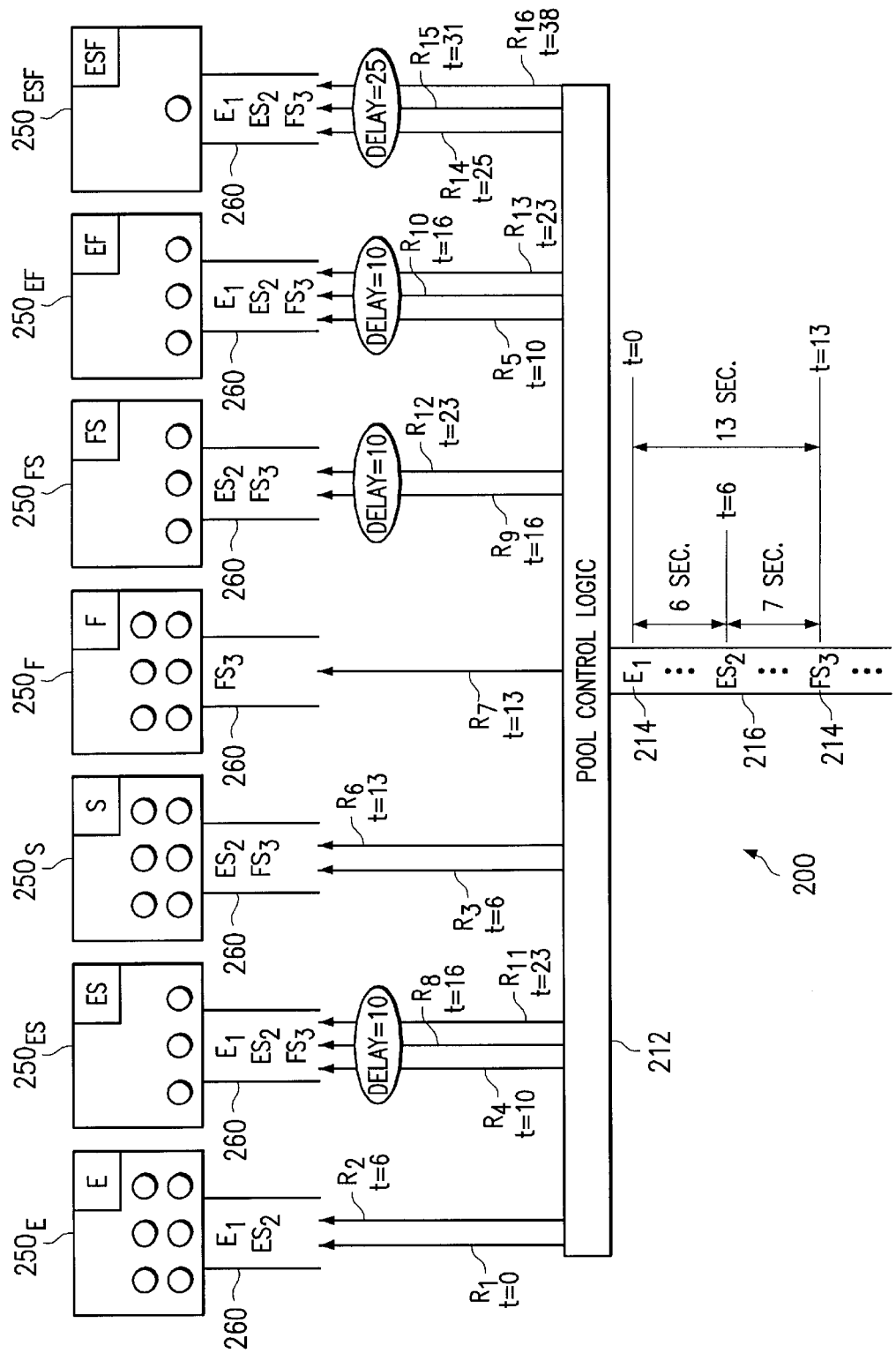
FIG. 13 illustrates a further exemplary implementation of a preferred; embodiment for allocating multi-functional resources to flexible requests.

Turning to FIG. 13, a preferred embodiment if further explained by example. In the exemplary ACD implementation 200 shown in FIG. 13, Pool Control Logic 212 may receive 3 requests 214. At time t=0, Pool Control Logic 212 receives an inflexible caller $E_1$ requesting an English speaking resource. Six seconds later, at time t=6, Pool Control Logic 212 then receives a flexible caller $ES_2$ requesting either an English or a Spanish speaking. Then Pool Control Logic 212 receives a flexible caller $FS_3$ requesting either a French or a Spanish speaking resource at time t=13. Furthermore, the exemplary ACD 200 of FIG. 13 may be implemented such that a ten second delay is utilized before attempting to service a caller with a resource from the secondary level (e.g., pools $250_{ES}$, $250_{FS}$, and $250_{EF}$). Thus, a request is required to be pending at the primary level (e.g., pools $250_{ES}$, $250_{FS}$, and $250_{EF}$) for ten seconds before Pool Control Logic 212 issues a request for a resource from the secondary level pools. Additionally, the exemplary ACD 200 of FIG. 13 may be implemented such that a twenty-five second delay is utilized before attempting to service a caller with a resource from the tertiary level (e.g., pool $250_{ESF}$). Thus, a request is required to be pending at the primary level (e.g., pools $250_E$, $250_S$, and $250_F$) for twenty-five seconds before Pool Control Logic 212 issues a request for a resource from the tertiary level pool.

When Pool Control Logic 212 receives caller $E_1$, at time t=0, Pool Control Logic 212 may immediately issue request $R_1$ to the homogeneous pool $250_E$. Supposing that no resources in pool $250_E$ are immediately available, call $E_1$ is queued in queue 260 for pool $250_E$. While call $E_1$ is pending, Pool Control Logic 212 receives flexible call $ES_2$ requesting either an English or a Spanish speaking resource at time t=6.

Pool Control Logic 212 may immediately, at time t=6, issue requests $R_2$ and $R_3$ to the homogeneous pools $250_E$ and $250_S$, respectively. Supposing that no resources in pools $250_E$ or $250_S$ are immediately available, call $ES_2$ is queued in queues 260 for pools $250_E$ and $250_S$. It should be noted that because request $E_1$ is already pending in queue 260 for pool $250_E$ when request $R_2$ is made, request $ES_2$ is queued behind request $E_1$ for pool $250_E$.

As described above, in this exemplary implementation, the delay assigned to secondary level pools $250_{ES}$, $250_{FS}$, and $250_{EF}$ is ten seconds. Therefore, at time t=10 Pool Control Logic 212 simultaneously generates requests $R_4$ and $R_5$ to secondary pools $250_{ES}$ and $250_{EF}$, respectively, for pending call El because, at time t=10, $E_1$ will have been pending for ten seconds. Supposing that no resources in pools $250_{ES}$ or $250_{EF}$ are immediately available when such requests are issued, call $E_1$ is queued in the queues 260 for pools $250_{ES}$ and $250_{EF}$. Therefore, at time t=10 request $E_1$ may be pending concurrently in pools $250_E$, $250_{ES}$, and $250_{EF}$.

Then, at time t=13, Pool Control Logic 212 receives flexible call $FS_3$ requesting either a French or a Spanish speaking resource, and Pool Control Logic 212 immediately, at time t=13, issues requests $R_6$ and $R_7$ to the homogeneous pools $250_S$ and $250_F$, respectively. Supposing that no resources in pools $250_S$ and $250_F$, are immediately available when such request is issued, call $FS_3$ is queued in queue 260 for pools $250_S$ and $250_F$. It should be noted that because request $ES_2$ is already pending in queue 260 for pool $250_S$ when request $R_6$ is made, request $FS_3$ is queued behind request $ES_2$ for pool $250_S$.

At time t=16, ten seconds will have passed since flexible request $ES_2$ first being received, and, therefore, Pool Control Logic 212 simultaneously issues requests $R_8$, $R_9$ and $R_{10}$ for pending call $ES_2$ to pools $250_{ES}$, $250_{FS}$ and $250_{EF}$, respectively. Supposing that no resources in pools $250_{ES}$, $250_{FS}$ and $250_{EF}$ are immediately available when such requests are issued, call $ES_2$ is queued in the queues 260 for pools $250_{ES}$, $250_{FS}$ and $250_{EF}$. Therefore, at time t=16 request $ES_2$ is pending concurrently in pools $250_E$, $250_S$, $250_{ES}$, $250_{ES}$ and $250_{EF}$. It should be noted that because request $E_1$ is already pending in queues 260 for pools $250_{ES}$ and $250_{EF}$ when requests $R_8$ and $R_{10}$ are made, request $ES_2$ is queued behind request $E_1$ for pools $250_{ES}$ and $250_{EF}$.

At time t=23, ten seconds will have passed since flexible request $FS_3$ first being received, and, therefore, Pool Control Logic 212 simultaneously issues requests $R_{11}$, $R_{12}$ and $R_{13}$ for pending call $FS_3$. Supposing that no resources in pools $250_{ES, 250FS}$ or $250_{EF}$ are immediately available when such requests are issued, call $FS_3$ is queued in the queues 260 for pools $250_{ES}$, $250_{FS}$ and $250_{EF}$. Therefore, at time t=23 request $FS_3$ is pending concurrently in pools $250_F$, $250_S$, $250_{ES}$, $250_{FS}$ and $250_{EF}$. It should be noted that because request $ES_2$ is already pending in queue 260 for pool $250_{FS}$ and requests $E_1$ and $ES_2$ are already pending in queues 260 for pools $250_{ES}$ and $250_{EF}$ when requests $R_{11}$, $R_{12}$ and $R_{13}$ are issued, request $FS_3$ is queued behind requests $ES_2$ and $E_1$.

At time t=25, twenty-five seconds will have passed since request $E_1$ first being received, and, therefore, Pool Control Logic 212 generates request $R_{14}$ to pool $250_{ESF}$ for pending call $E_1$. Supposing that no resource in pool $250_{ESF}$ is immediately available when such request is issued, call $E_1$ is queued in queue 260 for pool $250_{ESF}$. Therefore, at time t=25 request $E_1$ is pending concurrently in pools $250_E$, $250_{ES}$, $250_{EF}$, and $250_{ESF}$.

At time t=31, twenty-five seconds will have passed since flexible request $ES_2$ first being received, and, therefore, Pool Control Logic 212 generates request $R_{15}$ to pool $250_{ESF}$ for pending call $ES_2$. Supposing that no resource in pool $250_{ESF}$ is immediately available when such request is issued, call $ES_2$ is queued in queue 260 for pool $250_{ESF}$. Therefore, at time t=31 request $ES_2$ is pending concurrently in pools $250_E$, $250_S$, $250_{ES}$, $250_{FS}$, $250_{EF}$ and $250_{ESF}$. It should be noted that because request $E_1$ is already pending in queue 260 for pool $250_{ESF}$ when request $R_{15}$ is made, request $ES_2$ is queued behind request $E_1$.

At time t=38, twenty-five seconds will have passed since flexible request $FS_3$ first being received, and, therefore, Pool Control Logic 212 generates request $R_{16}$ to pool $250_{ESF}$ for pending call $FS_3$. Supposing that no resource in pool $250_{ESF}$ is available, call $FS_3$ is queued in queue 260 for pool $250_{ESF}$. Therefore, at time t=38 request $FS_3$ is pending concurrently in pools $250_F$, $250_S$, $250_{ES}$, $250_{FS}$, $250_{EF}$, and $250_{ESF}$. It should be noted that because requests $E_1$ and $ES_2$ are already pending in queue 260 for pool $250_{ESF}$ when request $R_{16}$ is issued, request $FS_3$ is queued behind requests $E_1$ and $ES_2$.

As a request is serviced, it is removed from all of the concurrently pending queues. For example, once request $E_1$ is serviced, it will be removed from queues 260 for pools $250_E$, $250_{ES}$, $250_{EF}$, and $250_{ESF}$. After the concurrently pending requests for serviced call $E_1$ are removed from queue 260, the request pending just behind request $E_1$ in each queue becomes the next pending request for that queue's pool 250 to service.

In an alternative embodiment, the exemplary ACD system 200 of FIG. 13 may be implemented such that less flexible requests advance to the secondary and tertiary levels more quickly than more flexible requests, in an attempt to utilize more flexible resources to service such less flexible requests. For example, a delay of ten seconds may be utilized before issuing a request to the secondary level resources (e.g., pools $250_{ES}$, $250_{FS}$, and $250_{EF}$) for the pending inflexible request $E_1$ of FIG. 13. However, a delay of twenty seconds may be utilized before issuing a request to such secondary level resources for the pending flexible request $ES_2$. Thus, because a greater number of primary resources are capable of servicing flexible request $ES_2$ (e.g., resources from pools $250_E$ and $250_S$), a greater time delay may be imposed before issuing requests for secondary level resources to try to service flexible request $ES_2$. Accordingly, the secondary and tertiary level resources may be more effectively utilized where most needed, e.g., to service less flexible requests.

Figure 14:
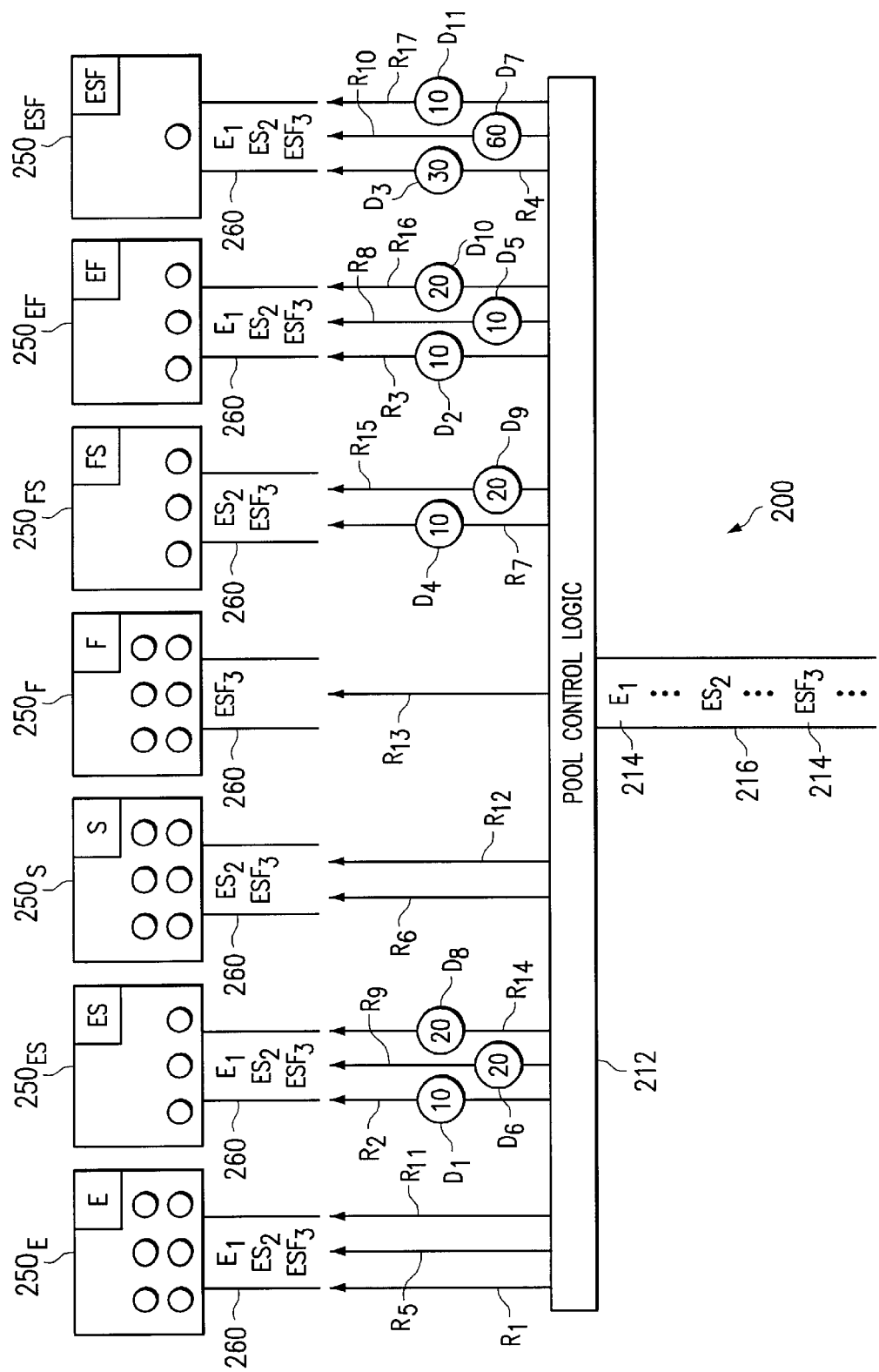
FIG. 14 illustrates a further exemplary implementation of a preferred embodiment for allocating multi-functional resources to flexible requests.

Turning now to FIG. 14, yet another exemplary implementation of ACD 200 of a preferred embodiment is illustrated. As described above, it may be less desirable to have a multi-functional/flexible resource serving a multi-functional/flexible request. For example, if a request is capable of speaking English, Spanish and French, the least optimum resource to satisfy such request may be a resource capable of speaking English, Spanish and French. That is, when a multi-functional/flexible resource is serving a multi-functional/flexible request, the flexibility of such resource is wasted on a flexible request. It may be more desirable to save such flexible resource for requests that are not as flexible. Accordingly, it may be desirable to have less priority assigned to multi-functional/flexible requests for multifunctional/flexible resources. A preferred embodiment may implement such a priority by treating multi-functional/flexible requests as a separate request for each functionality and summing together the delays for any pools in which more than one request is issued, as an example.

For example, suppose that a ten second delay is assigned to each secondary pool $250_{ES, 250FS}$ and $250_{EF}$, and a 30 second delay is assigned to the tertiary pool $250_{ESF}$. Further suppose that an inflexible request $E_1$ is received requesting an English speaking resource. In response, Pool Control Logic 212 may immediately issue a request $R_1$ to English pool $250_E$. Assuming that a resource is not immediately available to service request $E_1$, it may be queued in queue 260 for pool $250_E$. If after time delays $D_1$ and $D_2$ (each being ten seconds) request $E_1$ remains unsatisfied, Pool Control Logic 212 may issue requests $R_2$ and $R_3$ to secondary pools $250_{ES}$ and $250_{EF}$, respectively. If after time delay $D_3$ of 30 seconds request $E_1$ remains unsatisfied, Pool Control Logic 212 may issue request $R_4$ to tertiary pool $250_{ESF}$.

Now suppose that flexible request $ES_2$ is received requesting either an English or a Spanish speaking resource. In response, Pool Control Logic 212 may immediately issue requests $R_5$ and $R_6$ to pools $250_E$ and $250_S$, respectively. Assuming that a resource is not immediately available from either pool, request $ES_2$ may be queued in queues 260 for pools $250_E$ and $250_S$. If after a determined time delay the primary pools $250_E$ and $250_S$ are unable to service flexible request $ES_2$, requests may be issued to the secondary pools $250_{ES}$, $250_{FS}$ and $250_{EF}$. However, it may be less desirable to have request $ES_2$ serviced by a resource from pool $250_{ES}$. Because both the request $ES_2$ and resources from pool $250_{ES}$ are capable of speaking English and Spanish, pairing such a resource with such a request may not be desirable because it may be considered wasteful. Accordingly, in a preferred embodiment request $ES_2$ may be thought of as two requests: one request for English and one request for Spanish, and when the requests "collide" (as described below) the delays for such requests may be summed.

Continuing with the above example, Pool Control Logic 212 may issue request $R_7$ to secondary pool $250_{FS}$ after delay $D_4$ of ten seconds. Such a request may be thought of as a request to service the Spanish portion of the request $ES_2$ pending in queue 260 for pool $250_S$. Likewise, Pool Control Logic 212 may issue request $R_8$ to secondary pool $250_{EF}$ after delay $D_5$ of ten seconds. Such a request may be thought of as a request to service the English portion of the request $ES_2$ pending in queue 260 for pool $250_E$. Secondary pool $250_{ES}$ may also be capable of servicing request $ES_2$, and Pool Control Logic 212 may issue request $R_9$ to pool $250_{ES}$ after delay $D_6$ of twenty seconds. Such a request may be thought of as a request to satisfy both the English portion and the Spanish portion of flexible request $ES_2$ pending in queues 260 for pools $250_E$ and $250_S$ (e.g., the English and Spanish portions of request $ES_2$ "collide") because resources from pool $250_{ES}$ are capable of speaking both English and Spanish. Accordingly, Pool Control Logic 212 may add together the determined ten second delay for the English portion of the flexible request and the determined ten second delay for the Spanish portion of the flexible request and issue a request to pool $250_{ES}$ after a twenty second time delay. Accordingly, resources from secondary pool $250_{ES}$ may be requested only after requests have been issued for resources from secondary pools $250_{FS}$ and $250_{EF}$ for request $ES_2$.

If request $ES_2$ is still not serviced after a further determined time, Pool Control Logic may issue a request to tertiary pool $250_{ESF}$. A request to tertiary pool $250_{ESF}$ may be thought of as a request to satisfy both the English portion and the Spanish portion of flexible request $ES_2$ pending in queues 260 for pools $250_E$ and $250_S$ because resources from pool $250_{ESF}$ are capable of speaking both English and Spanish. Accordingly, Pool Control Logic 212 may add together the determined thirty second delay for the English portion of the flexible request and the determined thirty second delay for the Spanish portion of the flexible request and issue a request to pool $250_{ESF}$ after a sixty second time delay. It should be recognized that request $E_1$ was pending only thirty seconds before having a request issued to tertiary pool $250_{ESF}$, but request $ES_2$ is required to be pending sixty seconds before having such a request issued.

Continuing with the above example illustrated in FIG. 14, flexible request $ESF_3$ may be received. Request $ESF_3$ may be thought of as having three portions (or as being three separate requests), one portion for English, one portion for Spanish and one portion for French. Pool Control Logic 212 may immediately issue requests $R_{11}$, $R_{12}$ and $R_{13}$ to primary pools $250_E$, $250_S$ and $250_F$, respectively. If a resource is not immediately available from any of those pools to service request $ESF_3$, the request may be queued in queues 260 for each of the primary pools $250_E$, $250_S$ and $250_F$. If the request remains unsatisfied after a determined time period, Pool Control Logic 212 may issue requests to the secondary pools $250_{ES}$, $250_{FS}$ and $250_{EF}$. Pool Control Logic 212 may issue request $R_{14}$ to secondary pool $250_{ES}$ after time delay $D_8$ of twenty seconds. Such a request may be thought of as a request to satisfy both the English portion and the Spanish portion of flexible request $ESF_3$ pending in queues 260 for pools $250_E$ and $250_S$ because resources from pool $250_{ES}$ are capable of speaking both English and Spanish. Accordingly, Pool Control Logic 212 may add together the determined ten second delay for the English portion of the flexible request and the determined ten second delay for the Spanish portion of the flexible request and issue a request to pool $250_{ES}$ after a twenty second time delay.

Likewise, Pool Control Logic 212 may issue request $R_{15}$ to secondary pool $250_{FS}$ after time delay $D_9$ of twenty seconds. Such a request may be thought of as a request to satisfy both the French portion and the Spanish portion of flexible request $ESF_3$ pending in queues 260 for pools $250_F$ and $250_S$ because resources from pool $250_{FS}$ are capable of speaking both French and Spanish. Accordingly, Pool Control Logic 212 may add together the determined ten second delay for the French portion of the flexible request and the determined ten second delay for the Spanish portion of the flexible request and issue a request to pool $250_{FS}$ after a twenty second time delay.

Also, Pool Control Logic 212 may issue request $R_{16}$ to secondary pool $250_{EF}$ after time delay $D_{10}$ of twenty seconds. Such a request may be thought of as a request to satisfy both the English portion and the French portion of flexible request $ESF_3$ pending in queues 260 for pools $250_F$ and $250_F$ because resources from pool $250_{EF}$ are capable of speaking both English and French. Accordingly, Pool Control Logic 212 may add together the determined ten second delay for the English portion of the flexible request and the determined ten second delay for the French portion of the flexible request and issue a request to pool $250_{EF}$ after a twenty second time delay.

If a resource is not immediately available from any of the secondary pools to service flexible request $ESF_3$, the request may be queued in queues 260 for each of the secondary pools $250_{ES}$, $250_{FS}$ and $250_{EF}$. If the request still remains unsatisfied after a determined time period, Pool Control Logic 212 may issue a request to the tertiary pool $250_{ESF}$. Pool Control Logic 212 may issue request $R_{117}$ to tertiary pool $250_{ESF}$ after time delay $D_1$, of ninety (90) seconds. Such a request may be thought of as a request to satisfy the English portion, the Spanish portion and the French portion of flexible request $ESF_3$ pending in queues 260 for pools $250_E$, $250_S$ and $250_F$ because resources from tertiary pool $250_{ESF}$ are capable of speaking English, Spanish and French. Accordingly, Pool Control Logic 212 may add together the determined thirty second delay for the English portion of the flexible request, the determined thirty second delay for the Spanish portion of the flexible request and the determined thirty second delay for the French portion of the flexible request and issue a request to pool $250_{ES}$ after a ninety second time delay.

It should be understood that in alternative embodiments either the Pool Control Logic 212 or the resource pools may be responsible for prioritizing requests through time delays, and either the Pool Control Logic 212 or the resource pools may be responsible for removing concurrently pending requests from the queues of the "losing" pools when a request is satisfied by a "winning" pool. Any combination of the Pool Control Logic 212 and the resource pools controlling the prioritization of requests through time delays and removing requests from the queues of "losing" pools may be implemented in alternative embodiments. Any such alternative embodiment is intended to be within the scope of the present invention.

The examples in FIGS. 2–14 have been described as to prioritize requests $R_1$–$R_n$ according to a hierarchy of pools 410 in ascending order of multi-function capability (e.g., multi-lingualism) of the requests and/or the resources within the resource pools. Other hierarchies are possible, such as in order of economic value or demographic scarcity, with equivalent enabling effect. Alternatively, the hierarchy may be according to numeric value of the quantity of resources 412 contained within pools 410. Moreover, the hierarchy may be based on multiple characteristics, such as multi-function capability and numeric value of resources 412 contained within pools 410. Hierarchies may also be in ascending or descending order. As described herein, the hierarchy may account for requests' preferences, a resource manager's preferences, or a balance of the two.

In a preferred embodiment, the Pool Control Logic 212 uses a time sequence (or "cascade") to prioritize resource requests issued to selected resource pools to service an initial request (e.g., a caller request). In alternative embodiments, the resource pools 212 may utilize a time sequence (or "cascade") to prioritize resource requests issued to the selected resource pools to service an initial request (e.g., a caller request). The time sequence utilized by the Pool Control Logic 212 or the resource pools may advantageously be determined to observe particular flexibility, scarcity or value of the requests and the resources serving requests. The time sequence may be predetermined (e.g., entered by a user or predetermined by the Pool Control Logic 212 or resource pools) or it may be determined by the Pool Control Logic 212 or the resource pools in real-time. Thus, the Pool Control Logic 212 or the resource pools may monitor the operation of the system and adjust the time sequence accordingly, in real-time.

It will be further appreciated that the invention as described with reference to FIGS. 2–14 and the accompanying exemplary narrative are not limited to the number of resources or the number of pools shown in the FIGS. or used in the examples provided herein. It is within the scope of the present invention to allow any number of resource pools and any number of resources within each resource pool. It will be further appreciated that a resource pool may be able to satisfy any given number of requests. In the FIGS. and examples contained herein, multi-function (multi-skilled or multi-talented) pool $250_{ESF}$ could satisfy the most types of requests (i.e., 3 different types of requests). However, it is within the scope of the present invention to allow any number of multi-function (or multi-skilled or multi-talented) pools having any number of functions/skills/talents. Likewise, it will be appreciated that a request may be able to be satisfied by any given number of resources (e.g., may have unlimited flexibility). In the FIGS. and examples contained herein, flexible/multi-functional (multi-skilled or multi-talented) requests capable of speaking 3 different languages (English, Spanish and French) were provided. However, it is within the scope of the present invention to allow flexible requests having any number of functions/skills/talents.

It will be further appreciated that in accordance with the present invention, the queues shown and described herein may be actual physical queues or they may be "virtual" queues. That is, the queues shown and described for each of the resource pools (i.e., queues 260), the queue shown and described for the Pool Control Logic 212 (i.e., queue 216) may each be actual physical queues or may be "virtual" queues.

It will be further appreciated that the invention as described with reference to FIGS. 2–14 and the accompanying exemplary narrative are not limited to language-oriented resources and requests. The invention applies with equivalent enabling effect generally to allocating resources to flexible requests. The invention is enabling on many types of flexible requests for resources, such as telephone callers with multi-lingual capability, or flexible requests for data elements in a database, or flexible requests for computer network resources, or flexible requests for telephony network resources, or even, for example, flexible requests made by mechanics sharing tools out of a unitary toolbox.

Figure 8B:
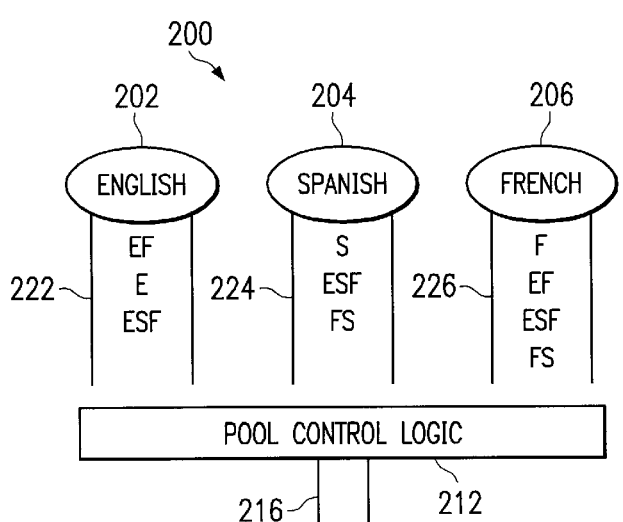

Thus, the resource management scheme of the present invention is not intended to be limited to telephony resources, but may be applied equally to various other types of resources. For example, various types of flexible requests for computer resources may be received and utilized for better management of the computer resources in servicing requests. For instance, as shown in the exemplary implementation of FIG. 15, various types of data storage resources may be included within a computer system for servicing data storage/retrieval requests from various types of devices. In the exemplary implementation of FIG. 15, various storage devices, such as floppy drive 1514, CD-ROM drive 1516, DVD drive 1518, tape drive 1519, and ZIP drive 1520, may be included within a computer system. A resource manager 1512 may be implemented to receive requests and manage allocation of the data storage devices to service such requests, much as the Pool Control Logic of the exemplary ACD systems described above received callers and allocated agents. One or more various types of devices that are capable of storing/retrieving data to/from such data storage devices are also provided, such as Personal Data Assistant ("PDA") 1502, personal computer ("PC") 1504, laptop computer 1506, and cellular telephone 1508. Such devices may have a direct connection to resource manager 1512, which enables communication of data therebetween, or they may be capable of communicating with resource manager 1512 via Network 1510, as shown in FIG. 8. Network 1510 may comprise any means of information communication, such as a PSN, a proprietary network, a general purpose processor-based information network, dedicated communication lines, a satellite system, a cable system, a computer network, direct PC to PC connection, a local area network (LAN), a wide area network (WAN), modem to modem connection, the Internet, an Intranet or any combination thereof suitable for providing information communication between a particular device (or "network element") and the resource manager 1512.

Accordingly, when one or more of the devices 1502, 1504, 1506, or 1508 requests to store data, resource manager 1512 may determine the appropriate storage device to satisfy such a request and allocate such storage device to service the request. Of course, the various storage devices may possess certain attributes, such as storage capacity, storage speed, retrieval speed, and/or other types of skills/attributes, which may or may not be suitable for servicing any given request received by resource manager 1512. For instance, a relatively flexible request requiring to store data a relatively small amount of data to any available device may be received by resource manager 1512, and resource manager 1512 may then efficiently service the flexible request utilizing an available data storage device. However, a less flexible request that requires storage of an extremely large amount of data may require that the resource manager 1512 allocate the ZIP drive 1520, for instance, to service such a less flexible request.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of managing resources, said method comprising the steps of:
   providing a finite number of resources for servicing requests thereto, said finite number of resources including at least a first resource having a first attribute and at least a second resource having a second attribute;
   receiving at least one request for at least one of said resources;
   determining the flexibility of said at least one request as to at least one attribute possessed by said resources for servicing said at least one request; and
   based at least in part on said flexibility of said at least one request, issuing at least one resource request to one or more of said resources.

2. The method of claim 1 wherein said step of determining the flexibility of said at least one request further includes the step of:
   determining one or more attributes of said resources that are suitable for servicing said at least one request.

3. The method of claim 1 wherein said resources include agents within a telephony call center.

4. The method of claim 3 wherein said at least one request includes a request from a caller to a telephony center.

5. The method of claim 4 wherein said at least a first resource having a first attribute includes an agent having a first language capability and wherein said at least a second resource having a second attribute includes an agent having a second language capability.

6. The method of claim 5 wherein said determining step includes determining the language capability of an agent that is suitable for servicing said caller.

7. The method of claim 1 wherein said resources include resources within a computer system.

8. The method of claim 7 wherein said resources include resources selected from the group consisting of: data input resources, data output resources, data storage resources, and data processing resources.

9. The method of claim 1 wherein said attribute includes at least one skill possessed by said resources.

10. The method of claim 1 wherein said attribute includes at least one functional capability possessed by said resources.

11. The method of claim 1 wherein said determining the flexibility of said at least one request comprises:
    determining that at least one of said at least one request is flexible such that any of a plurality of different attributes possessed by said resources are suitable for servicing the flexible request.

12. The method of claim 11 wherein said request is a request from a caller to a telephony center and said resources are agents within said telephony call center, and wherein said plurality of different attributes comprise a plurality of different languages.

13. A method of allocating resources selected from a finite number of resources for servicing requests, said method comprising the steps of:
    identifying at least a first attribute possessed by at least a first pool of said resources;
    identifying at least a second attribute possessed by at least a second pool of said resources;
    receiving requests for service by at least one of said resources;
    determining the flexibility of said requests, wherein at least one of said requests is determined to be flexible such that any of a plurality of different attributes possessed by said resources are suitable for servicing the at least one flexible request; and
    based at least in part on the determined flexibility of said determining for each of said requests at least one suitable resource for servicing the request.

14. The method of claim 13 wherein said step of determining the flexibility of said requests further includes the step of:
    determining one or more attributes of said resources that are suitable for servicing said at least one flexible request.

15. The method of claim 14 wherein said step of determining the flexibility of said requests further includes the steps of:
    determining whether said at least a first attribute possessed by said at least a first pool of said resources is suitable for servicing said at least one flexible request; and
    determining whether said at least a second attribute possessed by said at least a second pool of said resources is suitable for servicing said at least one flexible request.

16. The method of claim 15 further including the steps of:
    if determined that said at least a first attribute is suitable for servicing said at least one flexible request and determined that said at least a second attribute is suitable for servicing said at least one flexible request, then determining that any resource from said at least a first pool and said at least a second pool of resources is suitable for servicing said at least one flexible request.

17. The method of claim 16, further including the step of:
allocating a first available resource of said at least a first pool and said at least a second pool to service said at least one flexible request.

18. The method of claim 13 wherein said resources include agents within a telephony call center.

19. The method of claim 18 wherein said requests include a request from a caller to a telephony center.

20. The method of claim 19 wherein said at least a first attribute includes a first language capability and wherein said at least a second attribute includes a second language capability.

21. The method of claim 20 wherein said step of determining the flexibility of said requests includes determining the language capability of an agent that is suitable for servicing said caller.

22. The method of claim 11 wherein said resources include resources within a computer system.

23. The method of claim 22 wherein said resources include resources selected from the group consisting of: data input resources, data output resources, data storage resources, and data processing resources.

24. The method of claim 13 wherein said at least a first attribute and said at least a second attribute each include at least one skill possessed by said resources.

25. The method of claim 13 wherein said at least a first attribute and said at least a second attribute each include at least one functional capability possessed by said resources.

26. The method of claim 13 wherein said at least one flexible request is a request from a caller to a telephony center and said resources are agents within said telephony call center, and wherein said plurality of different attributes comprise a plurality of different languages.

27. A resource management system for managing a finite number of resources for servicing requests, said resource management system comprising:
at least a first pool of resources each possessing at least a first attribute;
at least a second pool of resources each possessing at least a second attribute;
means for receiving at least one request for service by at least one of said resources;
means for determining the flexibility of said at least one request; and
means, based at least in part on said flexibility of said at least one request, for determining at least one suitable resource for servicing said at least one request.

28. The system of claim 27 wherein said means for determining the flexibility of said at least one request includes a computer processor executing computer software code to determine one or more attributes of said resources that are suitable for servicing said at least one request.

29. The system of claim 27 wherein said means for determining at least one suitable resource includes a computer processor executing computer software code.

30. The system of claim 27 wherein said receiving means includes a connection to a network.

31. The system of claim 30, wherein said network is selected from the group consisting of:
public switched telephony network (PSTN), local area network (LAN), wide area network (WAN), the Internet, an Intranet, or any combination thereof.

32. The system of claim 27 wherein said receiving means includes a switching system.

33. The system of claim 32 wherein said switching system includes an ACD.

34. The system of claim 27 wherein said resources include agents within a telephony call center.

35. The system of claim 27 wherein said at least one request includes a request from a caller to a telephony center.

36. The system of claim 27 wherein said resources include resources within a computer system.

37. The system of claim 35 wherein said resources include resources selected from the group consisting of: data input resources, data output resources, data storage resources, and data processing resources.

38. The system of claim 27 wherein said at least a first attribute and said at least a second attribute each include at least one skill possessed by said resources.

39. The system of claim 27 wherein said at least a first attribute and said at least a second attribute each include at least one functional capability possessed by said resources.

40. The system of claim 27 wherein said means for determining determines at least one of the at least one request as being flexible such that any of a plurality of different attributes possessed by said resources are suitable for servicing the flexible request.

41. The system of claim 40 wherein said means for determining determines at least one of the at least one request as being flexible such that either of said resources of said first pool possessing said first attribute or said resources of said second pool possessing said second attribute are suitable for servicing the flexible request.

42. A resource management system for managing a finite number of resources for servicing requests, said system comprising:
connection to a network capable of receiving at least one request for at least one of said resources;
memory for storing computer executable program code, wherein said computer executable program code includes code executable to determine the flexibility of said at least one request as to attributes of said resources that are suitable for servicing said at least one request, and code executable to determine one or more resources suitable for servicing said at least one request based at least in part on said flexibility of said at least one request; and
processor for executing said computer executable program code.

43. The system of claim 42 wherein said network is selected from the group consisting of:
public switched telephony network (PSTN), local area network (LAN), wide area network (WAN), the Internet, an Intranet, or any combination thereof.

44. The system of claim 42 wherein said connection to a network includes a switching system.

45. The system of claim 44 wherein said switching system includes an ACD.

46. The system of claim 42 wherein said resources include agents within a telephony call center.

47. The system of claim 42 wherein said at least one request includes a request from a caller to a telephony center.

48. The system of claim 42 wherein said resources include resources within a computer system.

49. The system of claim 48 wherein said resources include resources selected from the group consisting of: data input resources, data output resources, data storage resources, and data processing resources.

50. The system of claim 42 wherein said code executable to determine the flexibility of said at least one request determines at least one of the at least one request as being flexible such that any of a plurality of different attributes possessed by said resources are suitable for servicing the flexible request.

* * * * *